(12) United States Patent
   Sakamoto et al.

(10) Patent No.: US 12,625,271 B2
(45) Date of Patent: May 12, 2026

(54) RANGING DEVICE

(71) Applicant: CANON KABUSHIKI KAISHA, Tokyo (JP)

(72) Inventors: Yasuyo Sakamoto, Kanagawa (JP); Masashi Niwa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 18/351,597

(22) Filed: Jul. 13, 2023

(65) Prior Publication Data
   US 2024/0027624 A1    Jan. 25, 2024

(30) Foreign Application Priority Data
   Jul. 25, 2022   (JP) ................................. 2022-117785

(51) Int. Cl.
   *G01S 17/931*     (2020.01)
   *B60W 60/00*      (2020.01)
   *G01S 7/484*      (2006.01)
   *G01S 7/486*      (2020.01)

(52) U.S. Cl.
   CPC ......... *G01S 17/931* (2020.01); *B60W 60/001* (2020.02); *G01S 7/484* (2013.01); *G01S 7/486* (2013.01); *B60W 2420/408* (2024.01); *B60W 2554/80* (2020.02)

(58) Field of Classification Search
   CPC ........ G01S 17/931; G01S 7/484; G01S 7/486; B60W 60/001; B60W 2554/80; B60W 2420/408
   See application file for complete search history.

(56) References Cited

U.S. PATENT DOCUMENTS

| | | | | |
|---|---|---|---|---|
| 2019/0383906 A1* | 12/2019 | Nakamura | ............ | G01S 17/894 |
| 2022/0075066 A1* | 3/2022 | Azuma | ................ | G01C 15/002 |
| 2023/0324518 A1* | 10/2023 | Ohkawa | ................ | G01S 7/4868 |
| | | | | 356/4.01 |
| 2024/0353559 A1* | 10/2024 | Sakaguchi | ............ | G01S 17/931 |

FOREIGN PATENT DOCUMENTS

| | | |
|---|---|---|
| JP | 2019-215260 A | 12/2019 |
| JP | 2020-190419 A | 11/2020 |

OTHER PUBLICATIONS

U.S. Appl. No. 18/348,075, filed Jul. 6, 2023 by Masashi Niwa.

* cited by examiner

*Primary Examiner* — Peter D Nolan
*Assistant Examiner* — Mikko Okechukwu Obioha
(74) *Attorney, Agent, or Firm* — VENABLE LLP

(57)          ABSTRACT
A ranging device includes: a frequency distribution generation unit that generates a frequency distribution of a light reception count value counted in each bin period; a frequency distribution holding unit that holds the frequency distribution generated by the frequency distribution generation unit; and a phase setting unit that sets a phase of start timings of the bin periods with respect to periodic light emission timings to an object. In a case where a first frequency distribution acquired by a first phase in a first period is held in the frequency distribution holding unit, and then a second frequency distribution acquired by a second phase in a second period next to the first period is held in the frequency distribution holding unit, at least a part of the first frequency distribution is erased from the frequency distribution holding unit until the holding of the second frequency distribution is completed.

13 Claims, 13 Drawing Sheets

FIG. 2

FIG. 4A
FIG. 4B
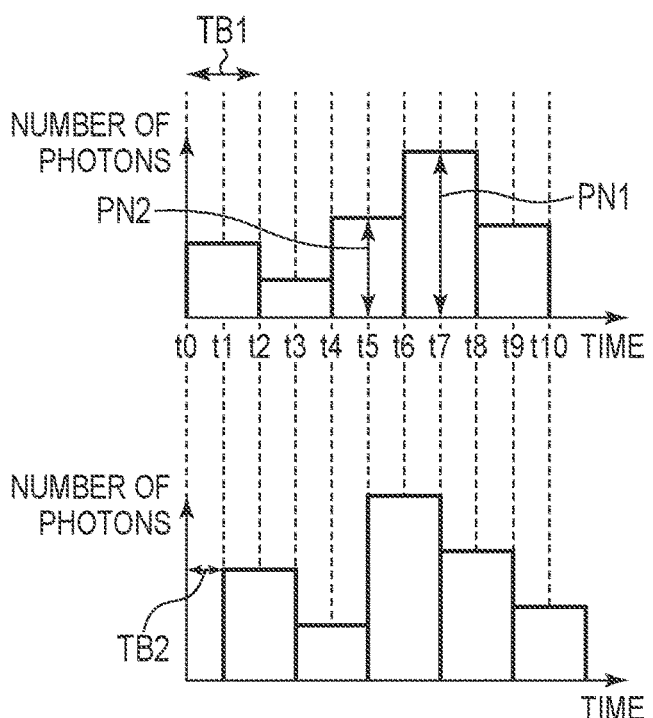
FIG. 5A
FIG. 5B
FIG. 5C
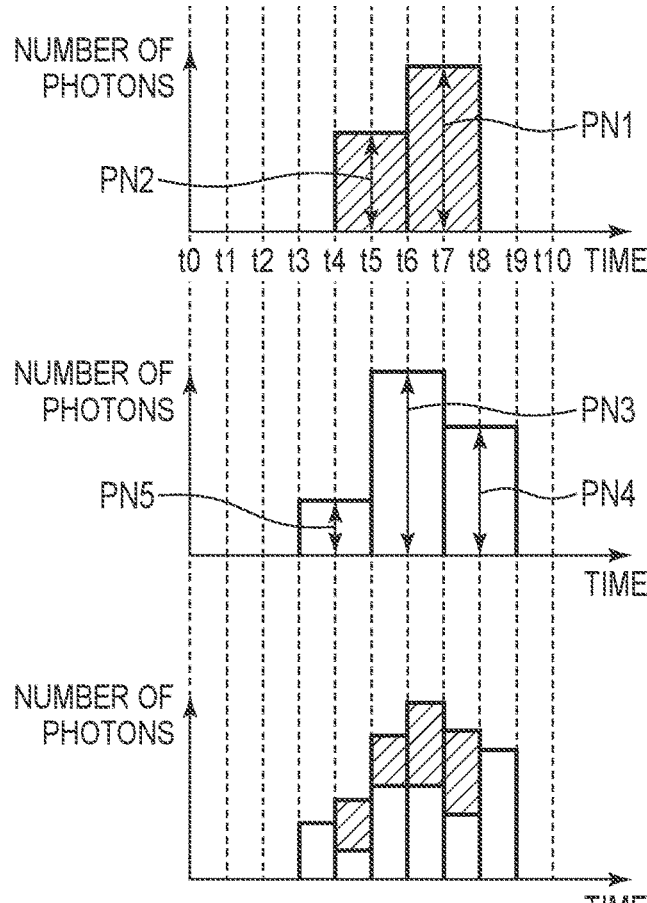

F I G. 7

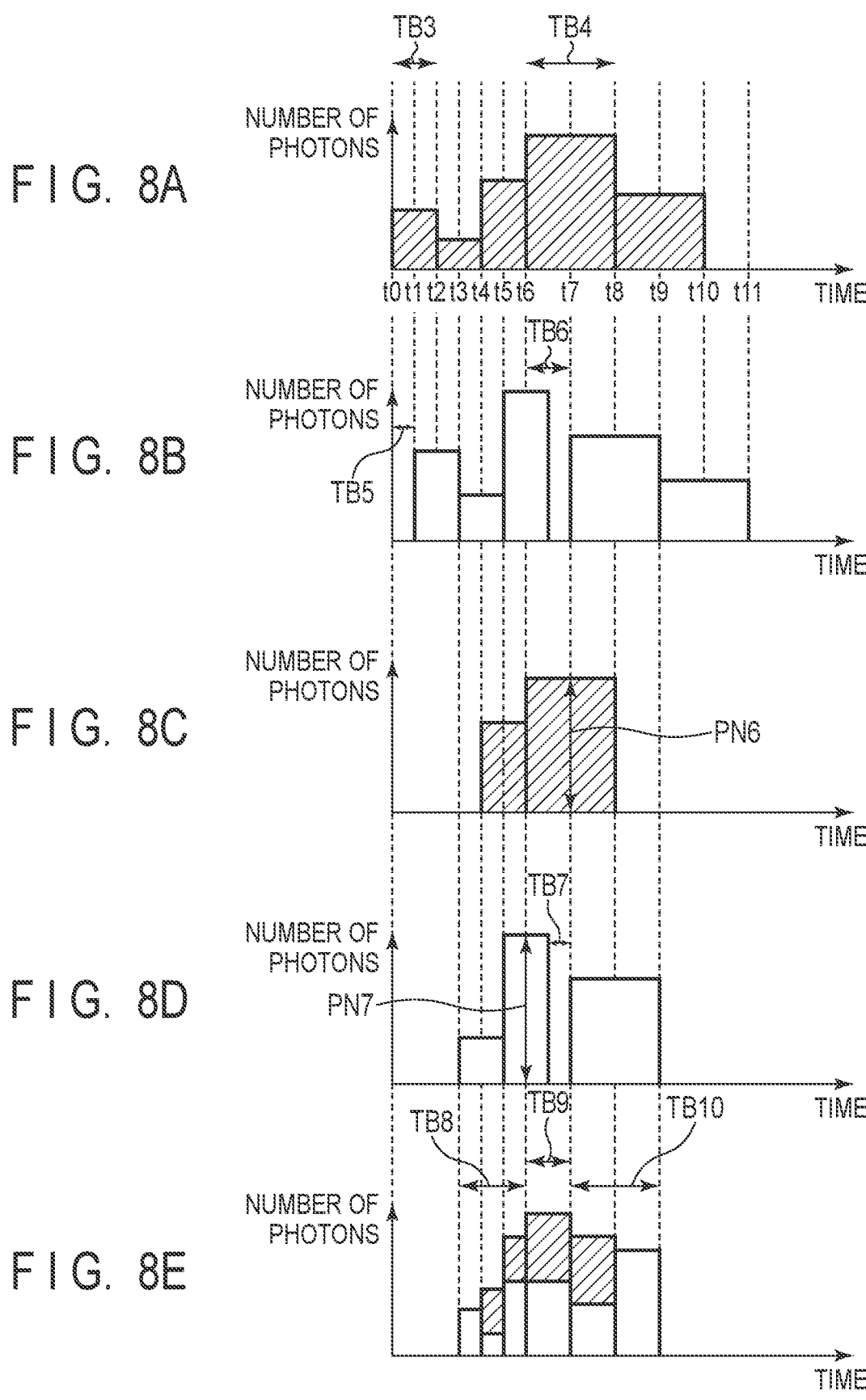
F I G. 8A
F I G. 8B
F I G. 8C
F I G. 8D
F I G. 8E

F I G. 9
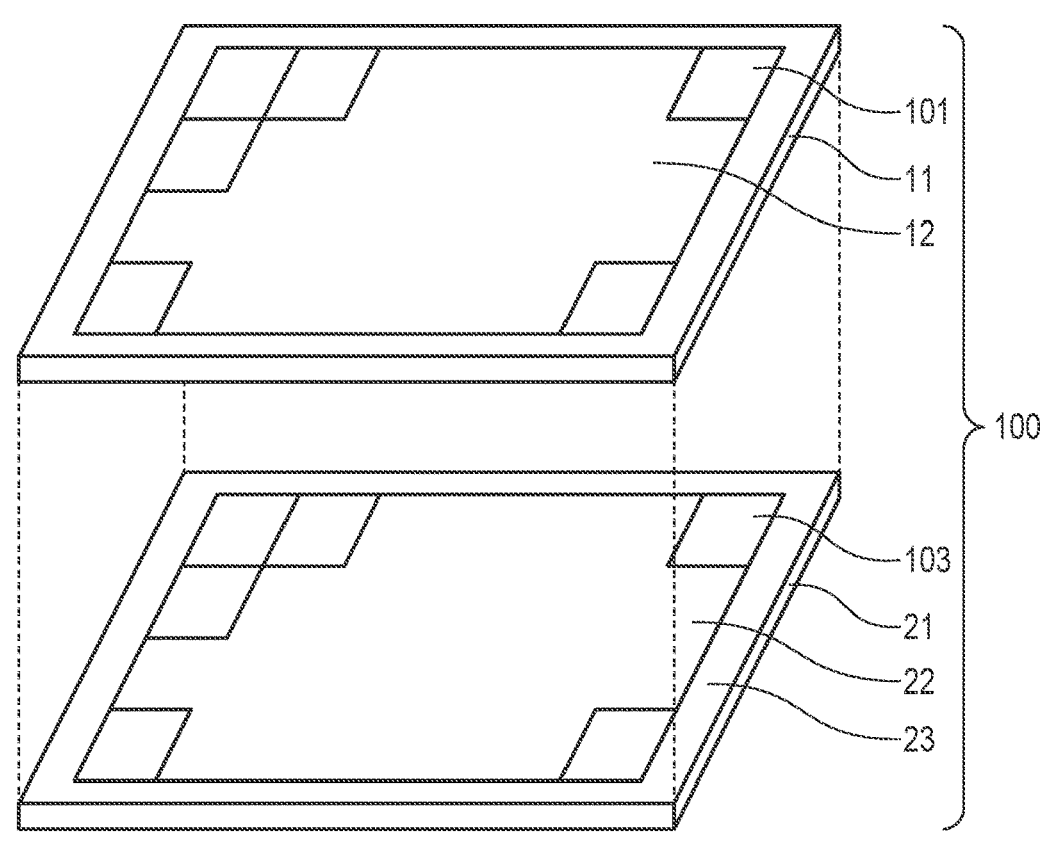
F I G. 10

F I G. 11
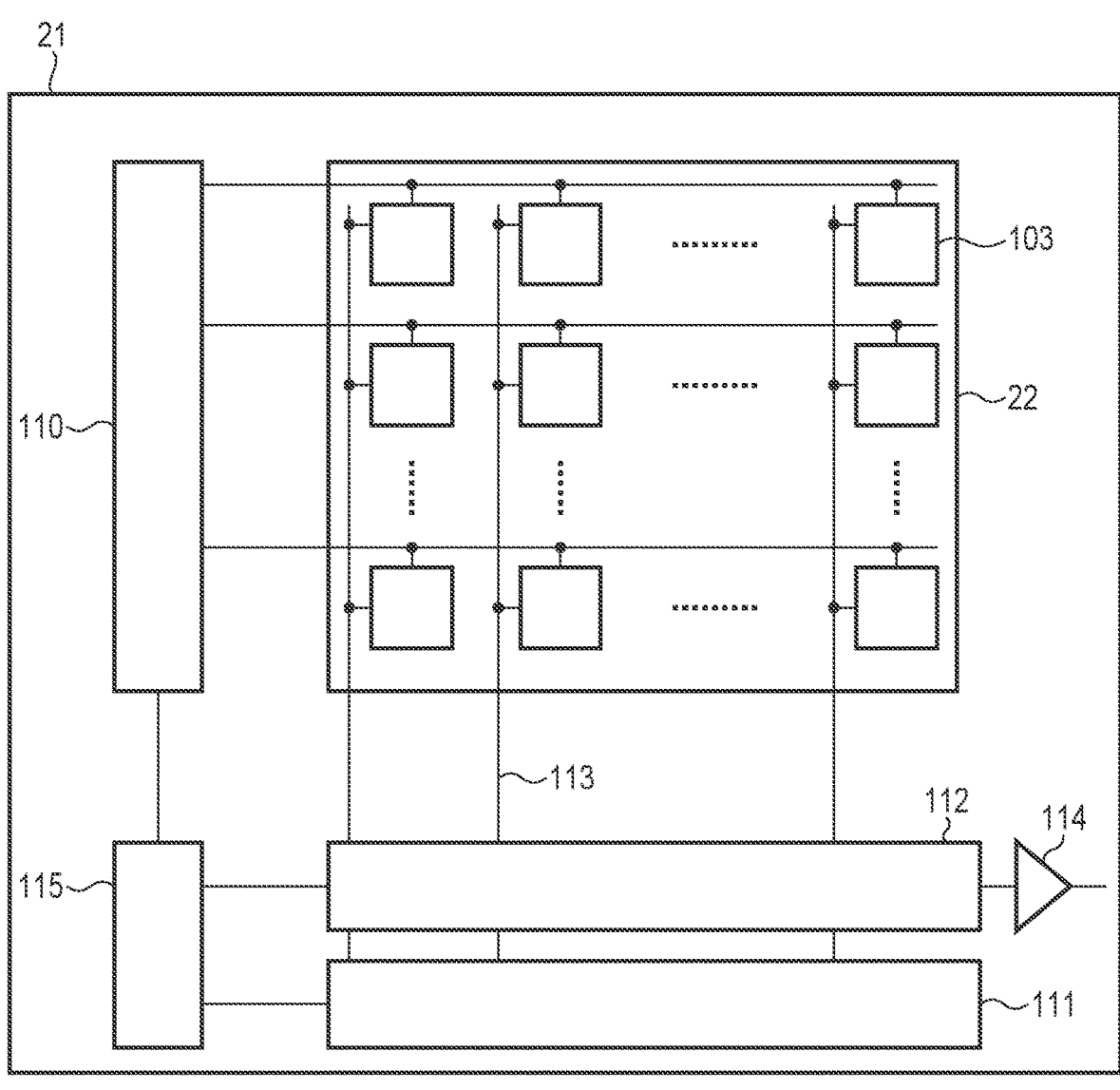

F I G. 12
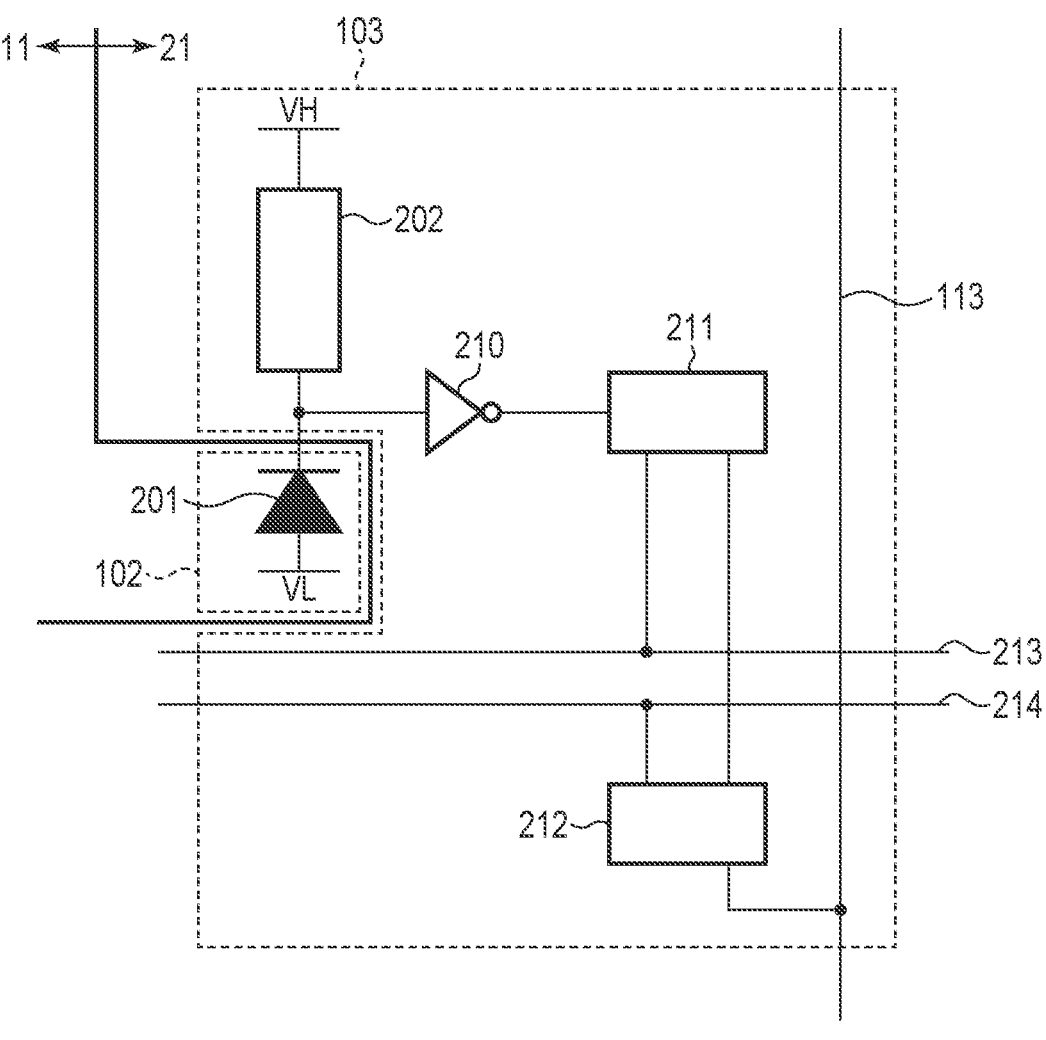

F I G. 13A
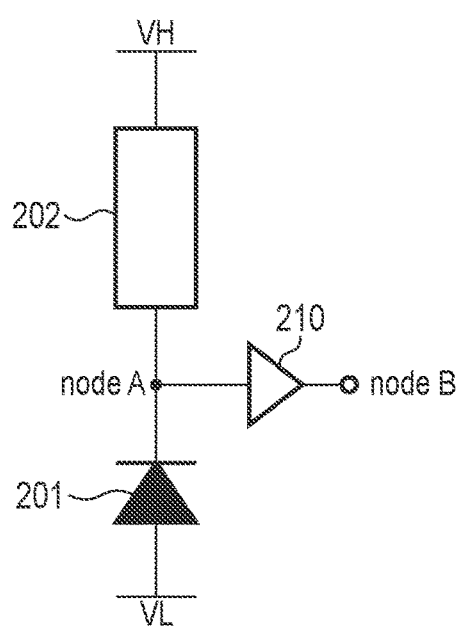
F I G. 13B
F I G. 13C
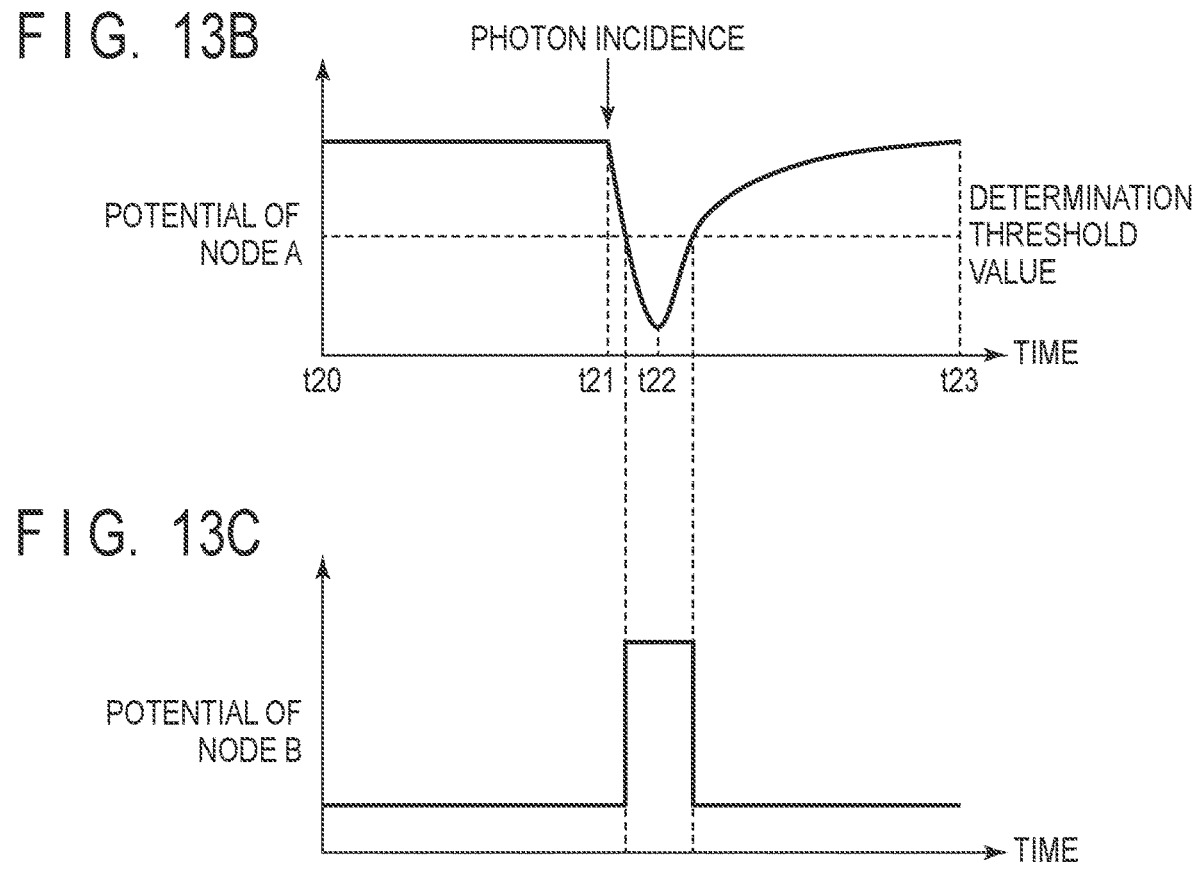

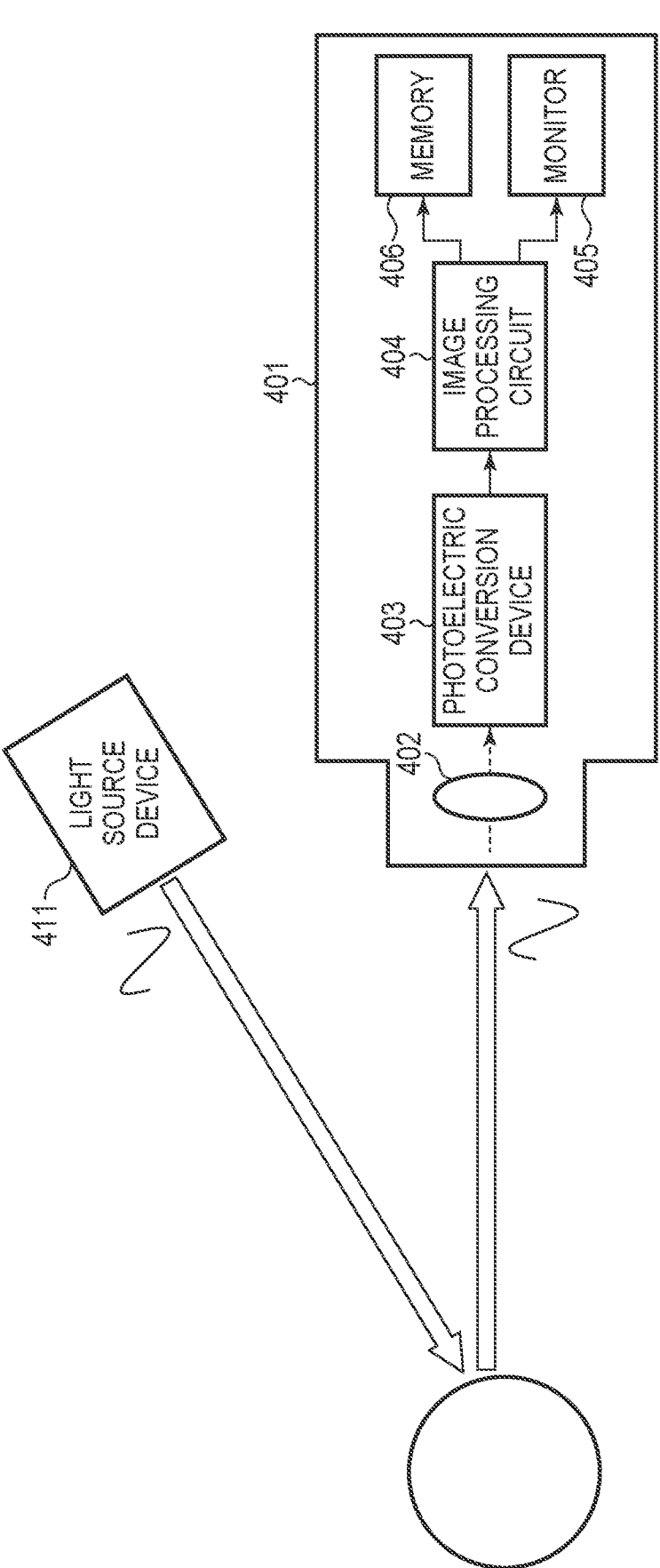

F I G. 15A
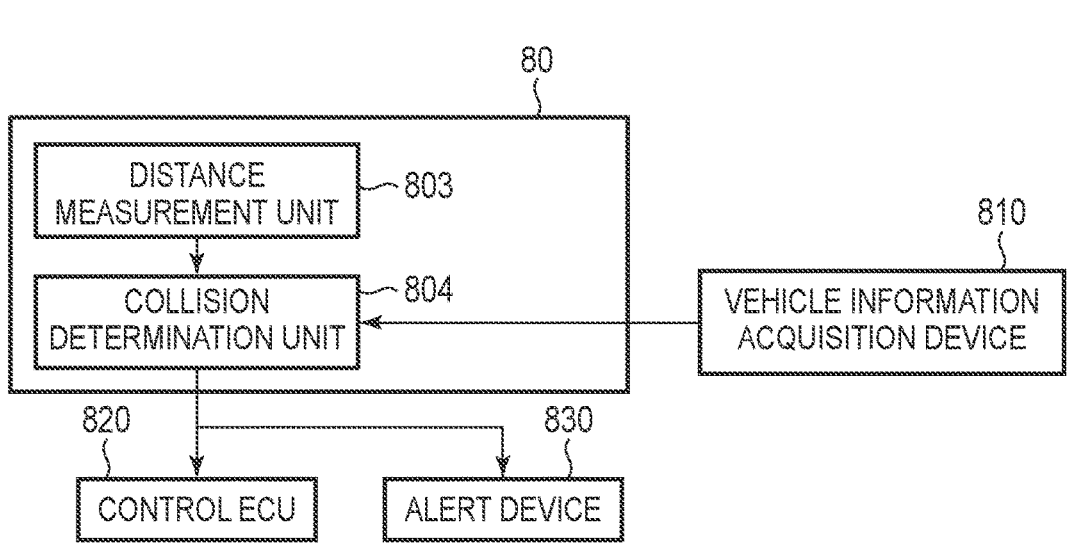
F I G. 15B
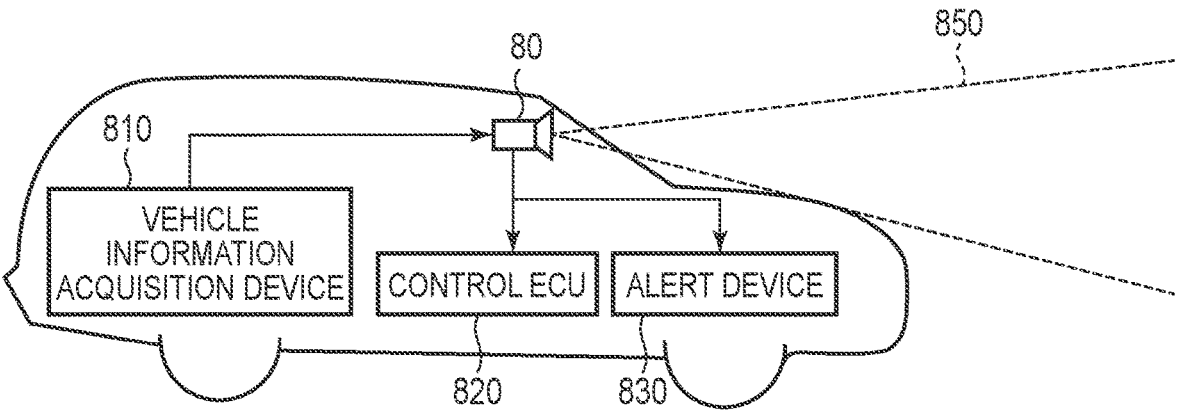

RANGING DEVICE

BACKGROUND OF THE INVENTION

Field of the Invention

The present disclosure relates to a ranging device.

Description of the Related Art

Japanese Patent Application Laid-Open No. 2020-190419 discloses a ranging device that measures a distance to an object based on a time difference between a time at which light is irradiated and a time at which reflected light is received. The ranging device of Japanese Patent Application Laid-Open No. 2020-190419 calculates a distance from a frequency distribution of a count value of incident light with respect to time from light emission. Japanese Patent Application Laid-Open No. 2020-190419 discloses a method of measuring a distance to an object by making the phase of acquisition time of the frequency distribution different for each of a plurality of sub-pixels and superimposing the frequency distributions of the count values acquired by the plurality of sub-pixels.

Japanese Patent Application Laid-Open No. 2019-215260 discloses a method of calculating accuracy of ranging by acquiring a plurality of signals with different phases of acquisition times of signals in a ranging device.

In order to store a plurality of frequency distributions, a large amount of storage capacity is required. Therefore, in a method of using signals acquired with different phases as described in Japanese Patent Application Laid-Open No. 2020-190419 and Japanese Patent Application Laid-Open No. 2019-215260, it may be a problem to reduce the storage capacity required for holding the frequency distribution while maintaining the ranging accuracy such as spatial resolution in the light receiving surface.

SUMMARY OF THE INVENTION

It is an object of the present disclosure to provide a ranging device in which a storage capacity required for holding a frequency distribution is reduced while maintaining ranging accuracy.

According to a disclosure of the present specification, there is provided a ranging device including: a time counting unit configured to perform time counting; a light receiving unit configured to generate a pulse based on light including reflected light from an object and counts the pulse to acquire a light reception count value; a frequency distribution generation unit configured to generate a frequency distribution of the light reception count value counted in each of a plurality of bin periods in the time counting; a frequency distribution holding unit configured to hold the frequency distribution generated by the frequency distribution generation unit; a phase setting unit configured to set a phase of start timings of the plurality of bin periods with respect to periodic light emission timings to the object; and a holding information control unit configured to control holding of information in the frequency distribution holding unit. In a case where a first frequency distribution acquired by a first phase in a first period is held in the frequency distribution holding unit, and then a second frequency distribution acquired by a second phase different from the first phase in a second period next to the first period is held in the frequency distribution holding unit, the holding information control unit controls the frequency distribution holding unit so that at least a part of the first frequency distribution is erased from the frequency distribution holding unit until the holding of the second frequency distribution is completed.

Further features of the present invention will become apparent from the following description of exemplary embodiments with reference to the attached drawings.

BRIEF DESCRIPTION OF THE DRAWINGS

FIG. 2 is a diagram illustrating an outline of an operation of the ranging device in one ranging period according to the first embodiment.

FIGS. 4A and 4B are histograms illustrating examples of frequency distributions acquired in the first embodiment.

FIGS. 5A, 5B, and 5C are histograms illustrating an example of compositing of frequency distributions acquired in the first embodiment.

FIG. 7 is a block diagram illustrating a schematic configuration example of a ranging device according to a second embodiment.

FIGS. 8A, 8B, 8C, 8D, and 8E are histograms illustrating examples of frequency distributions acquired in the second embodiment.

FIG. 9 is a schematic view illustrating the overall configuration of a photoelectric conversion device according to a third embodiment.

FIG. 10 is a schematic block diagram illustrating a configuration example of a sensor substrate according to the third embodiment.

FIG. 11 is a schematic block diagram illustrating a configuration example of a circuit substrate according to the third embodiment.

FIG. 12 is a schematic block diagram illustrating a configuration example of one pixel of a photoelectric conversion unit and a pixel signal processing unit according to the third embodiment.

FIGS. 13A, 13B, and 13C are diagrams illustrating the operation of an avalanche photodiode according to the third embodiment.

FIG. 14 is a schematic diagram of a photodetection system according to a fourth embodiment.

FIGS. 15A and 15B are schematic diagrams of equipment according to a fifth embodiment.

DESCRIPTION OF THE EMBODIMENTS

Figure 1:
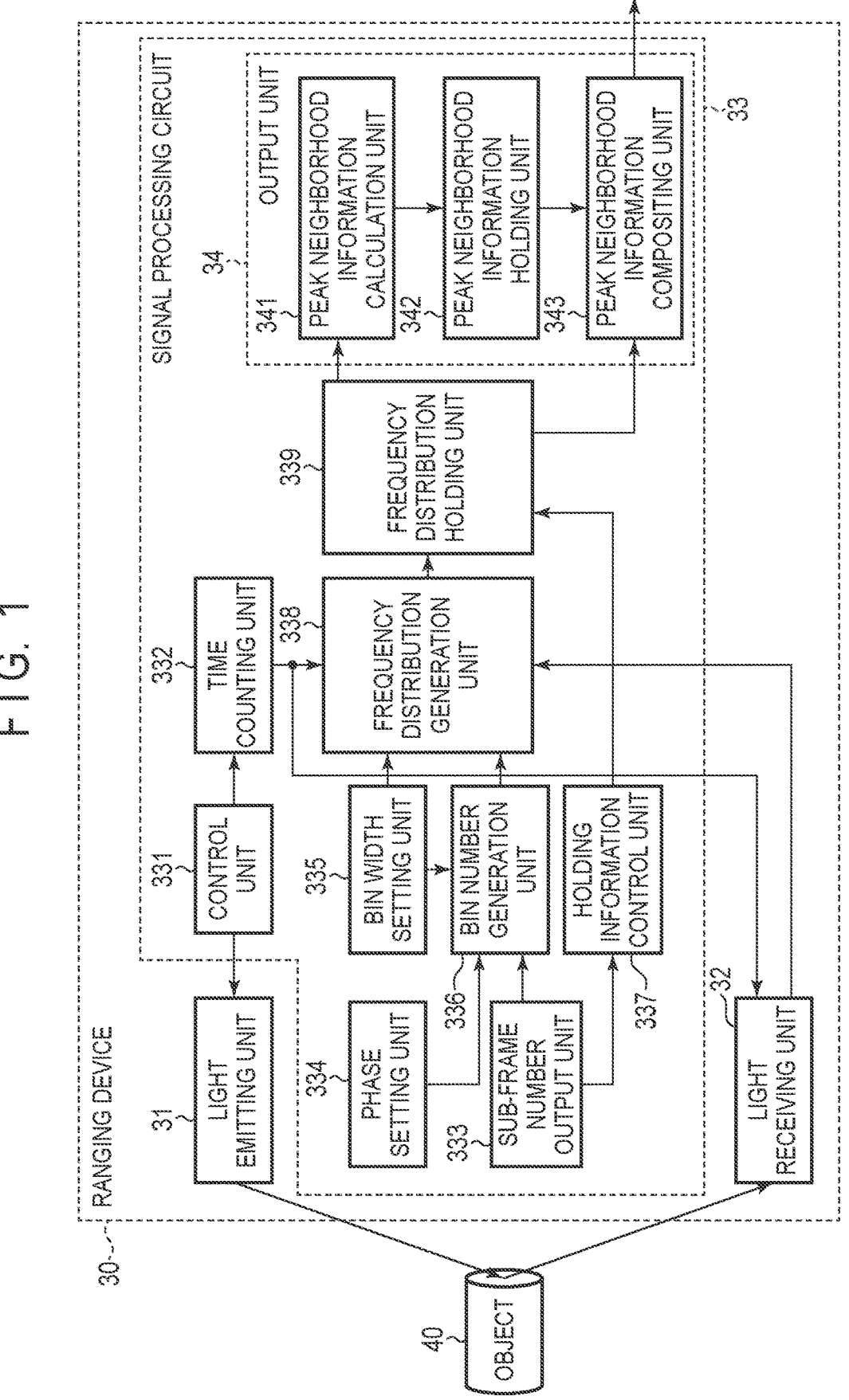
FIG. 1 is a block diagram illustrating a schematic configuration example of a ranging device according to a first embodiment.

Preferred embodiments of the present invention will now be described in detail in accordance with the accompanying drawings. In the drawings, the same or corresponding elements are denoted by the same reference numerals, and the description thereof may be omitted or simplified.

First Embodiment

FIG. 1 is a block diagram illustrating a schematic configuration example of a ranging device 30 according to the present embodiment. The ranging device 30 includes a light emitting unit 31, a light receiving unit 32, and a signal processing circuit 33. The signal processing circuit 33 includes a control unit 331, a time counting unit 332, a sub-frame number output unit 333, a phase setting unit 334, a bin width setting unit 335, a bin number generation unit 336, a holding information control unit 337, a frequency distribution generation unit 338, a frequency distribution holding unit 339, and an output unit 34. The output unit 34 includes a peak neighborhood information calculation unit 341, a peak neighborhood information holding unit 342, and a peak neighborhood information compositing unit 343. Note that the configuration of the ranging device 30 illustrated in the present embodiment is an example, and is not limited to the illustrated configuration.

The ranging device 30 measures a distance to an object 40 by using a technique such as a light detection and ranging (LiDAR). The ranging device 30 measures a distance from the ranging device 30 to the object 40 based on the time difference until the light emitted from the light emitting unit 31 is reflected by the object and received by the light receiving unit 32.

The light received by the light receiving unit 32 includes ambient light such as sunlight in addition to the reflected light from the object 40. For this reason, the ranging device 30 measures incident light at each of a plurality of time intervals, and performs ranging in which the influence of ambient light is reduced by using a method of determining that reflected light is incident during a period in which the amount of light peaks. The ranging device 30 of the present embodiment may be, for example, a flash LiDAR that emits laser light to a predetermined ranging area including the object 40, and receives reflected light by a pixel array.

The light emitting unit 31 is a light source that emits light such as laser light to the outside of the ranging device 30. When the ranging device 30 is a flash LiDAR, the light emitting unit 31 may be a surface light source such as a surface emitting laser.

The light receiving unit 32 generates a pulse signal including a pulse based on the incident light and counts the pulse to acquire a light reception count value. The light reception count value acquired by the light receiving unit 32 is input to the frequency distribution generation unit 338. The light receiving unit 32 is, for example, a photoelectric conversion device including an avalanche photodiode as a photoelectric conversion element. In this case, when one photon is incident on the avalanche photodiode and a charge is generated, one pulse is generated by avalanche multiplication. By counting pulses by a counter included in the light receiving unit 32, the light reception count value corresponding to the number of incident photons may be acquired. However, the light receiving unit 32 may be, for example, a photoelectric conversion element using another photodiode.

The time counting unit 332, the sub-frame number output unit 333, the phase setting unit 334, the bin width setting unit 335, the bin number generation unit 336, the holding information control unit 337, the frequency distribution generation unit 338, the frequency distribution holding unit 339, and the output unit 34 perform signal processing on the light reception count value. The circuits constituting these units may include a counter for counting pulses, a processor for performing arithmetic processing of digital signals, a memory for storing digital signals, and the like. The memory may be, for example, a semiconductor memory.

The time counting unit 332 performs time counting based on the control of the control unit 331 to acquire an elapsed time from a time at which counting is started as a digital signal. The control unit 331 synchronously controls a light emission timing in the light emitting unit 31 and a start of the time counting in the time counting unit 332. Thus, the time counting unit 332 can count the elapsed time from the light emission in the light emitting unit 31. The time counting unit 332 includes, for example, a circuit such as a ring oscillator and a counter, and counts a clock pulse that vibrates at high speed and at a constant period, thereby performing the time counting. For example, when the cycle of the clock pulse is 0.1 microseconds and the time count value changes from "0" to "10" by counting the clock pulse, the elapsed time is one microsecond. The control unit 331 may further control the operation of other parts in the ranging device 30. Further, the time counting unit 332 may supply the time count value to the light receiving unit 32 in order to control the operation timing of the light receiving unit 32.

The frequency distribution generation unit 338 associates the light reception count value input from the light receiving unit 32 with the time count value input from the time counting unit 332 so as to distribute them to a plurality of bins set by the bin width setting unit 335 and the bin number generation unit 336. Thereby, the frequency distribution generation unit 338 generates a frequency distribution. The frequency distribution generated by the frequency distribution generation unit 338 is temporarily stored in a storage area in the frequency distribution holding unit 339.

Now, with further reference to FIGS. 2 and 3A to 3D, an outline of an operation in one ranging period and a relationship between a frame period, a sub-frame period, a shot, and a bin related to the frequency distribution generated by the frequency distribution generation unit 338 will be described.

Figure 2:
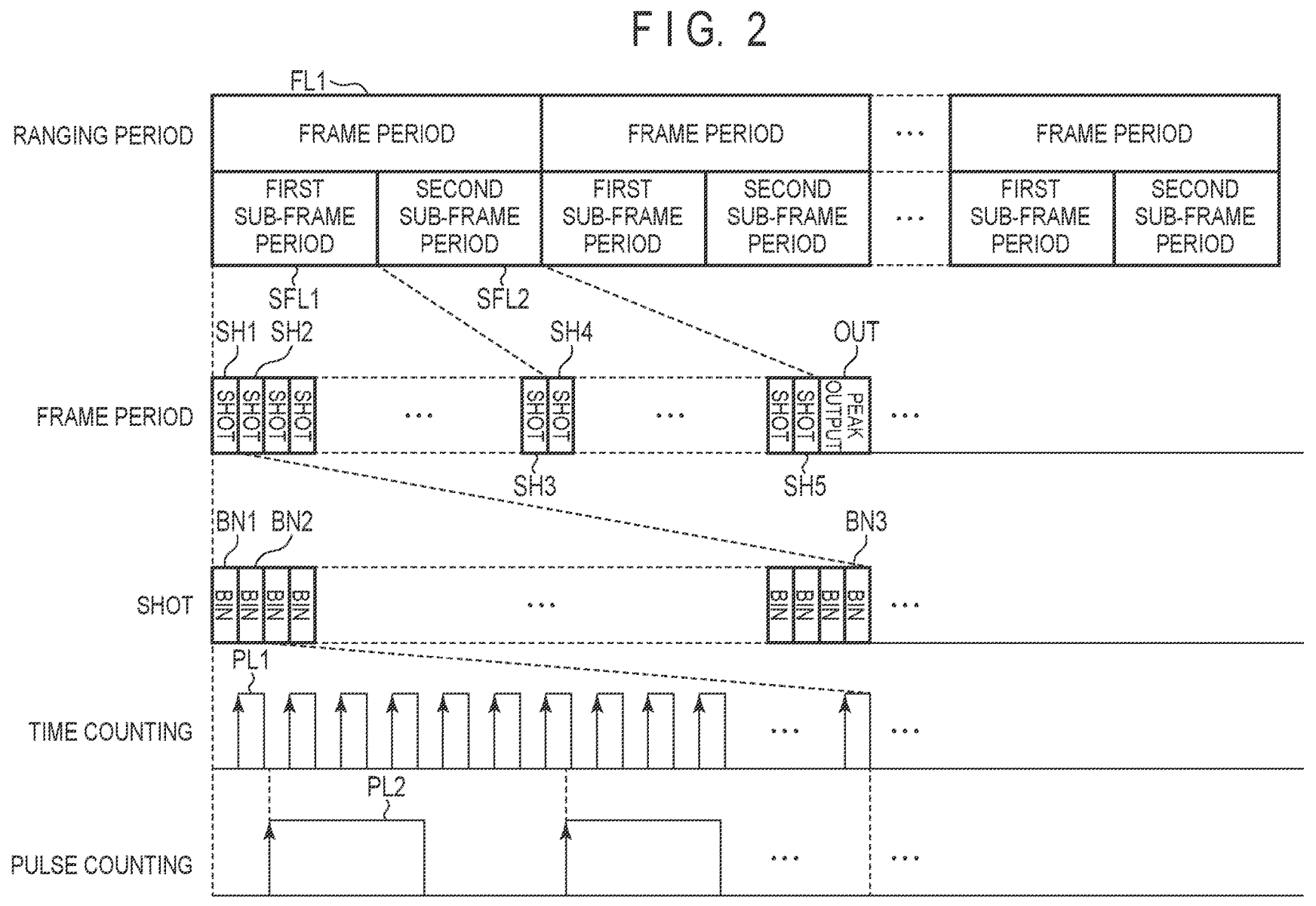

FIG. 2 is a diagram illustrating an outline of the operation of the ranging device 30 according to the present embodiment in one ranging period. In the description of FIG. 2, it is assumed that the ranging device 30 is a flash LiDAR. In the "ranging period" of FIG. 2, a plurality of frame periods included in one ranging period are illustrated. The frame period FL1 indicates a first frame period in one ranging period. The frame period is a period in which the ranging device 30 performs one ranging and outputs a signal indicating a distance (ranging result) from the ranging device 30 to the object 40 to the outside. After the frame period FL1, similar frame periods are repeated until the ranging period ends.

One frame period FL1 includes a first sub-frame period SFL1 and a second sub-frame period SFL2 next to the first sub-frame period SFL1. The number of sub-frame periods included in one frame period FL1 is not particularly limited, but is two in the present embodiment. The number of sub-frame periods may be set by the phase setting unit 334.

In the "frame period" of FIG. 2, a plurality of shots SH1, SH2, . . . , SH5 included in the frame period FL1 and a peak output OUT are illustrated. The shot is one period in which the light emitting unit 31 emits light once and the frequency distribution is updated by the light reception count value based on the light emission. In the following description, the number of shots in one frame period FL1 is 1000. The number of shots in the first sub-frame period SFL1 and the number of shots in the second sub-frame period SFL2 are both 500. The shot SH1 indicates the first shot in the frame period FL1. The shot SH2 indicates the second shot in the frame period FL1. The shot SH3 indicates the 500th shot in the frame period FL1. The shot SH4 indicates the 501st shot in the frame period FL1. The shot SH5 indicates the 1000th shot in the frame period FL1. The peak output OUT indicates a period during which a ranging result is output based on a peak acquired by accumulating signals of a plurality of shots.

In the "shot" of FIG. 2, a plurality of bins BN1, BN2, . . ., BN3 included in the shot SH1 are illustrated. The "bin" indicates one time interval during which a series of light reception counting is performed, and is a period during which a pulse based on incident light is counted to acquire a light reception count value. The bin BN1 indicates a first bin in the shot SH1. The bin BN2 indicates a second bin in the shot SH1. The bin BN3 indicates a last bin in the shot SH1.

The "time counting" in FIG. 2 schematically illustrates a pulse PL1 used for time counting in the time counting unit 332. As illustrated in FIG. 2, the time counting unit 332 counts the pulse PL1 that rises periodically to generate a time count value. When the time count value reaches a predetermined value, the bin BN1 ends, and the process transitions to the next bin BN2.

The "pulse counting" in FIG. 2 schematically illustrates a pulse PL2 based on incident light counted in the light receiving unit 32. When one photon is incident on the light receiving unit 32, one pulse PL2 rises. In the example of FIG. 2, two pulses rise in the period of the bin BN1, and "2" is acquired as the light reception count value of the bin BN1. Similarly, the light reception count values are sequentially acquired for the bin BN2 and after the bin BN2. As illustrated in FIG. 2, the frequency of the pulse PL1 of the time counting is set sufficiently higher than the frequency of the rising edge of the pulse PL2 of the pulse counting. In this case, the number of pulses PL2 can be appropriately counted.

Figures 3A, 3B, 3C, 3D:
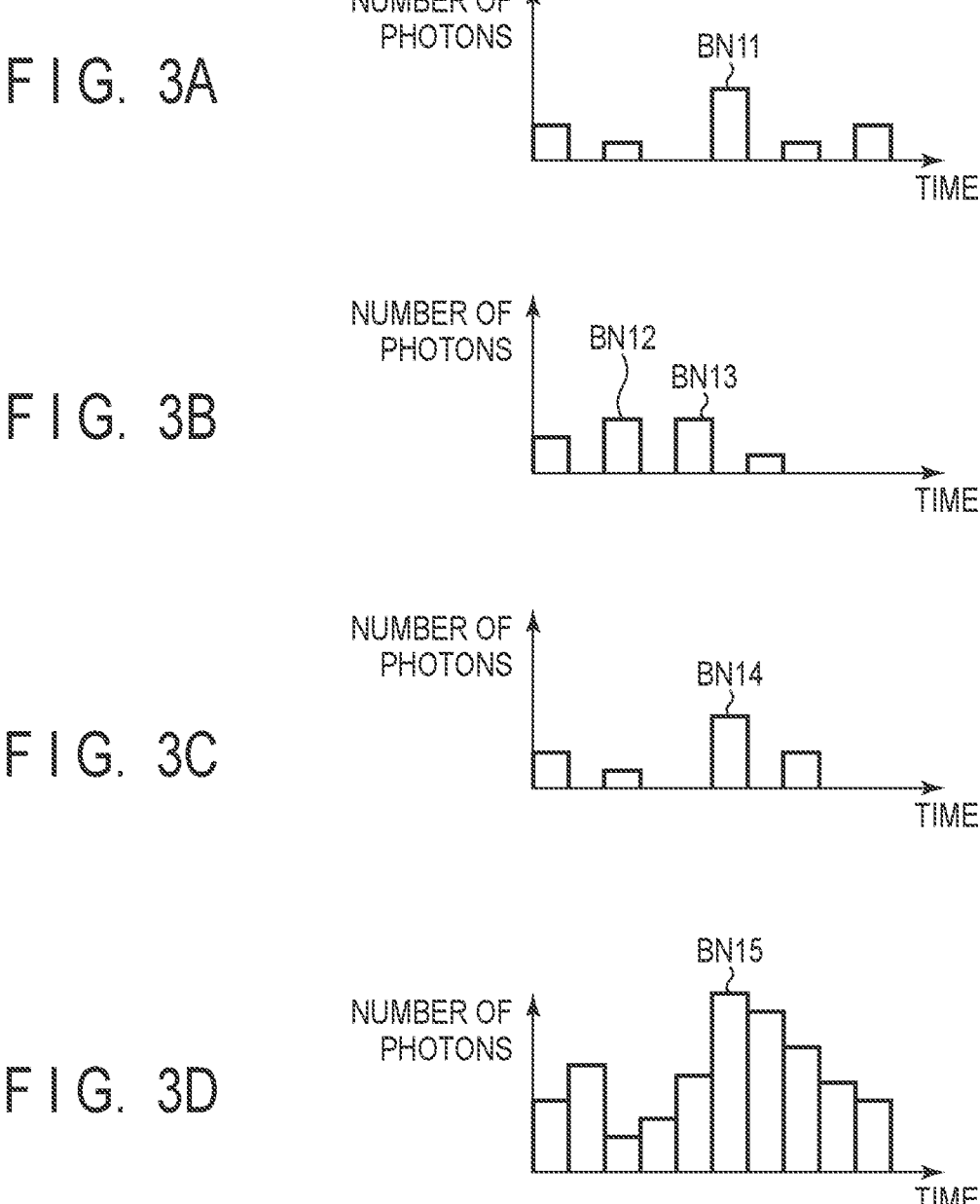
FIGS. 3A, 3B, 3C, and 3D are histograms visually illustrating frequency distributions of pulse count values according to the first embodiment.

FIGS. 3A to 3D are histograms visually illustrating the frequency distributions of the light reception count values counted in the light receiving unit 32. In this specification, the frequency distribution is frequency information corresponding to a predetermined class width, and is not necessarily displayed visually. FIGS. 3A, 3B, and 3C illustrate examples of histograms of the number of photons (corresponding to the light reception count value) in the first shot, the second shot, and the third shot, respectively. FIG. 3D illustrates an example of a histogram acquired by integrating the number of photons of all shots. The horizontal axis represents the elapsed time from light emission. One interval of the histogram corresponds to a period of one bin in which photon detection is performed. The vertical axis represents the number of photons detected in each bin period.

As illustrated in FIG. 3A, in the first shot, the number of photons of the sixth bin BN11 is a peak. As illustrated in FIG. 3B, in the second shot, the number of photons of the third bin BN12 is equal to the number of photons of the fifth bin BN13, and these are peaks. As illustrated in FIG. 3C, in the third shot, the number of photons of the sixth bin BN14 is a peak. In the second shot, different bins from the other shots are peaks. This is due to light reception count values due to ambient light other than reflected light from the object 40.

As illustrated in FIG. 3D, in the histogram obtained by integrating the number of photons of all shots, the sixth bin BN15 is a peak. This peak bin corresponds to a distance between the ranging device 30 and the object 40.

By integrating the light reception count values of a plurality of shots, even when the light reception count value due to ambient light is included as in the second shot of FIG. 3B, it is possible to detect a bin having a high possibility of reflected light from the object 40 more accurately. Therefore, even when the light emitted from the light emitting unit 31 is weak, the ranging can be performed with high accuracy by employing a process in which a plurality of shots are repeated.

The sub-frame number output unit 333 outputs a sub-frame number of the frequency distribution to be acquired to the bin number generation unit 336 and the holding information control unit 337. The phase setting unit 334 sets a phase in acquiring the frequency distribution. Here, the phase is a parameter corresponding to a relative shift amount of the start timing of the bin period with respect to the periodic light emission timing of the light emitting unit 31. The phase setting unit 334 sets the number of divisions of a frame (the number of sub-frames). The bin number generation unit 336 generates a bin number specifying a bin of the frequency distribution based on information output from the sub-frame number output unit 333, the phase setting unit 334, and the bin width setting unit 335. The bin width setting unit 335 specifies a bin width of the frequency distribution. The information of bin number and the bin width is used for generation of a frequency distribution in the frequency distribution generation unit 338.

Now, operations of the sub-frame number output unit 333, the phase setting unit 334, the bin number generation unit 336, and the bin width setting unit 335 will be described with further reference to FIGS. 4A and 4B. FIG. 4A is an example of a histogram illustrating a frequency distribution generated in the first sub-frame period, and FIG. 4B is an example of a histogram illustrating a frequency distribution generated in the second sub-frame period.

The sub-frame number output unit 333 outputs a sub-frame number based on the number of shots and information on the number of divisions of the frame acquired from the phase setting unit 334. As described above, in the present embodiment, the number of shots in one frame period is 1000, the first half 500 shots are included in the first sub-frame period, and the second half 500 shots are included in the second sub-frame period. For example, when the current shot is the 250th shot, the sub-frame number output unit 333 outputs a sub-frame number indicating the first sub-frame period.

The phase setting unit 334 sets the acquisition start time of the frequency distribution with time t0 as a reference time for each sub-frame. The time difference between the time t0 and the acquisition start time corresponds to the phase. The time t0 corresponds to the light emission timing. That is, the time t0 may be the same as the light emission time, that is, the start time of the time counting. However, the time t0 may be a time when a predetermined time count value has elapsed from the light emission time.

In the present embodiment, an example in which one bin is divided into two by setting a bin number for each time interval obtained by dividing one bin width into two will be described. The number of divisions of the bin width is the same as the number of divisions of the sub-frame periods in one frame period set by the phase setting unit 334.

In the acquisition of the frequency distribution (first frequency distribution) of the first sub-frame period (first period) illustrated in FIG. 4A, the phase setting unit 334 sets the time difference from the time t0 to zero (first phase), that is, the acquisition start time is t0+0. In the acquisition of the frequency distribution (second frequency distribution) of the second sub-frame period (second period) illustrated in FIG. 4B, the phase setting unit 334 sets the time difference from the time t0 to TB2 (second phase), that is, the acquisition start time is t0+TB2. Here, the time difference TB2 is a half of the bin width TB1 set by the bin width setting unit 335. Thereby, in the second sub-frame, acquisition of the frequency distribution is started from time t1 shifted by the time difference TB2 from the time t0.

The bin number generation unit 336 generates a bin number by dividing the bin width set by the bin width setting unit 335 by the number of divisions set by the phase setting unit 334. In the present embodiment, since the bin width is divided into two as described above, even-numbered bin numbers 0, 2, 4, . . . corresponding to times t0, t2, t4, . . . are assigned to the bins of the first sub-frame. Then, odd-numbered bin numbers 1, 3, 5, . . . corresponding to times t1, t3, t5, . . . are assigned to bins of the second sub-frame.

The frequency distribution generation unit 338 distributes the light reception count value input from the light receiving unit 32 and the time count value input from the time counting unit 332 based on bin information from the bin number generation unit 336 and the bin width setting unit 335. Thereby, the frequency distribution generation unit 338 generates a frequency distribution for each sub-frame period. When a frequency distribution of one sub-frame is generated, the frequency distribution is temporarily held in a storage area in the frequency distribution holding unit 339.

The peak neighborhood information calculation unit 341 calculates information of a bin in the neighborhood of a peak from the frequency distribution of one sub-frame held in the frequency distribution holding unit 339. For example, the light reception count value PN1 of the bin (bin number 6) at which the light reception count value is the peak from the time t6 to the time t8 and the light reception count value PN2 of the bin (bin number 4) at which the light reception count value is the second from the time t4 to the time t6 are calculated.

The peak neighborhood information holding unit 342 holds information of "first sub-frame: bin number 6 (light reception count value PN1) and bin number 4 (light reception count value PN2)" calculated by the peak neighborhood information calculation unit 341. In this way, the peak neighborhood information holding unit 342 holds the number of the sub-frame, the bin number in the neighborhood of the peak, and the light reception count values in association with each other.

When the holding of this information is completed by the peak neighborhood information holding unit 342, the holding information control unit 337 erases the information of the frequency distribution held in the storage area in the frequency distribution holding unit 339. Since the information of "first sub-frame: bin number 6 (light reception count value PN1) and bin number 4 (light reception count value PN2)" is used in the subsequent processing, the information of the entire frequency distribution of the first sub-frame is not used in the subsequent processing. Therefore, even if the erase processing is performed, information necessary for the subsequent processing is secured.

In the present embodiment, the data held in the peak neighborhood information holding unit 342 is only the information of the upper two bins, but the number of the data is not particularly limited and may be a predetermined number. The data held in the peak neighborhood information holding unit 342 may be only one of the uppermost data, or may be three or more.

The peak neighborhood information compositing unit 343 generates a frequency distribution (third frequency distribution) of one frame by compositing a part of the frequency distribution of the first sub-frame and a part of the frequency distribution of the second sub-frame held in the peak neighborhood information holding unit 342. The composited frequency distribution may be used to calculate the distance.

With further reference to FIGS. 5A to 5C, the operation of compositing sub-frames in the peak neighborhood information compositing unit 343 will be described. FIG. 5A is a histogram corresponding to information held in the peak neighborhood information holding unit 342 in the frequency distribution generated in the first sub-frame period. FIG. 5B is a histogram in which information necessary for compositing processing in the peak neighborhood information compositing unit 343 is left from the frequency distribution generated in the second sub-frame period. That is, FIG. 5B illustrates a histogram of bins from time t3 to time t9, including before and after bins of a range from time t4 to time t8 in FIG. 5A. FIG. 5C is a histogram after the compositing processing.

As illustrated in FIG. 5B, the light reception count values of the bin (bin number 5) from time t5 to time t7 is PN3. Similarly, the light reception count values of the bin (bin number 7) from the time t7 to the time t9 is PN4, and the light reception count values of the bin (bin number 3) from the time t3 to the time t5 is PN5. In the example of the compositing method of the present embodiment, the numbers of light reception count values are multiplied by ½ and added each other for bins in a range in which the first sub-frame and the second sub-frame overlap each other. In addition, the light reception count values are used as it is for bins in a range in which the first sub-frame and the second sub-frame do not overlap each other.

Specifically, in the bin (bin number 3) from the time t3 to the time t4, the light reception count value PN5 of the second sub-frame is used as it is for the composited frequency distribution. In the bin (bin number 4) from the time t4 to the time t5, since there are light reception count values in both the first sub-frame and the second sub-frame, (PN2/2+PN5/2) which is an average value of both of them is used for the composited frequency distribution. The subsequent bins are composited in the similar manner to generate a frequency distribution in which only the neighborhood of the peak is extracted as illustrated in the histogram of FIG. 5C.

Even in the frequency distribution in which only the neighborhood of the peak of the sub-frame is extracted as illustrated in FIG. 5C, the bin of the peak can be specified in the same manner as in the normal frequency distribution. As illustrated in FIG. 5C, since the bin (bin number 6) from the time t6 to the time t7 is a peak, it is possible to detect that the object 40 exists at a distance corresponding to the bin number 6 in this frame.

As described above, by compositing a plurality of frequency distributions having different phases, a frequency distribution having a bin width narrower than the bin width of the frequency distribution before compositing can be generated. Thus, the ranging can be performed with a distance resolution higher than the distance resolution corresponding to the frequency distribution before compositing, and the accuracy of the ranging can be improved. In other words, the frequency distribution before compositing can be acquired by a bin width wider than the bin width in the distance resolution required for ranging.

Note that the method of compositing the frequency distributions illustrated in the present embodiment is an example. Other compositing methods may be applied as long as a frequency distribution having a high distance resolution can be generated from a plurality of frequency distributions having different phases to identify a peak.

Here, the storage capacity of the frequency distribution holding unit 339 will be described. In the present embodiment, the number of bins of the frequency distribution to be held in the frequency distribution holding unit 339 may be equal to or less than half the number of bins corresponding to the distance resolution of the frequency distribution for ranging. Generally, the storage capacity required for holding the frequency distribution is proportional to "(the number of pixels)×(the number of bins)×(the number of light reception count values)×(the number of shots)". From this, it is understood that the storage capacity of the frequency distribution holding unit 339 can be reduced by reducing the number of bins. As illustrated in FIGS. 5A to 5C, the bin widths of FIGS. 5A and 5B, which are sub-frames before compositing, are twice the bin width of FIG. 5C used for peak calculation. Therefore, according to the method of the present embodiment, the number of bins to be held in the frequency distribution holding unit 339 can be reduced to half without lowering the distance resolution as compared with the case where the frequency distribution of the sub-frame is acquired with the same bin width as that in FIG. 5C. Similarly, when the number of divisions of a frame is three, the number of bins to be held in the frequency distribution holding unit 339 can be reduced to one third.

In the present embodiment, since the distance resolution is ensured by compositing the frequency distributions, the number of frequency distributions to be acquired increases. However, since the periods during which a plurality of frequency distributions are acquired are different from each other, it is not necessary to hold all of the acquired frequency distributions in the frequency distribution holding unit 339 at the same time, and the frequency distribution after the information in the neighborhood of the peak is extracted may be erased. Thereby, the same storage area in the frequency distribution holding unit 339 can be shared by a plurality of frequency distributions. As described above, by reducing the number of bins and erasing the frequency distribution after extracting the peak neighborhood information, the storage capacity of the frequency distribution holding unit 339 can be reduced.

Instead of a method in which the peak neighborhood information calculation unit 341 and the peak neighborhood information holding unit 342 extract and hold information of some bins, information of all bins may be held outside the frequency distribution holding unit 339. In this case, it is possible to reduce the storage capacity in the ranging device 30 by preparing a storage capacity for a sub-frame in the frequency distribution holding unit 339 in the ranging device 30, and performing the compositing processing of a plurality of sub-frames outside the ranging device 30. In the present embodiment, the storage capacity of the frequency distribution holding unit 339 is reduced mainly by acquiring and compositing a plurality of frequency distributions having different phases. Therefore, the storage capacity used for compositing the frequency distributions in the output unit 34 and the storage capacity outside the ranging device 30 are not particularly limited.

Figure 6:
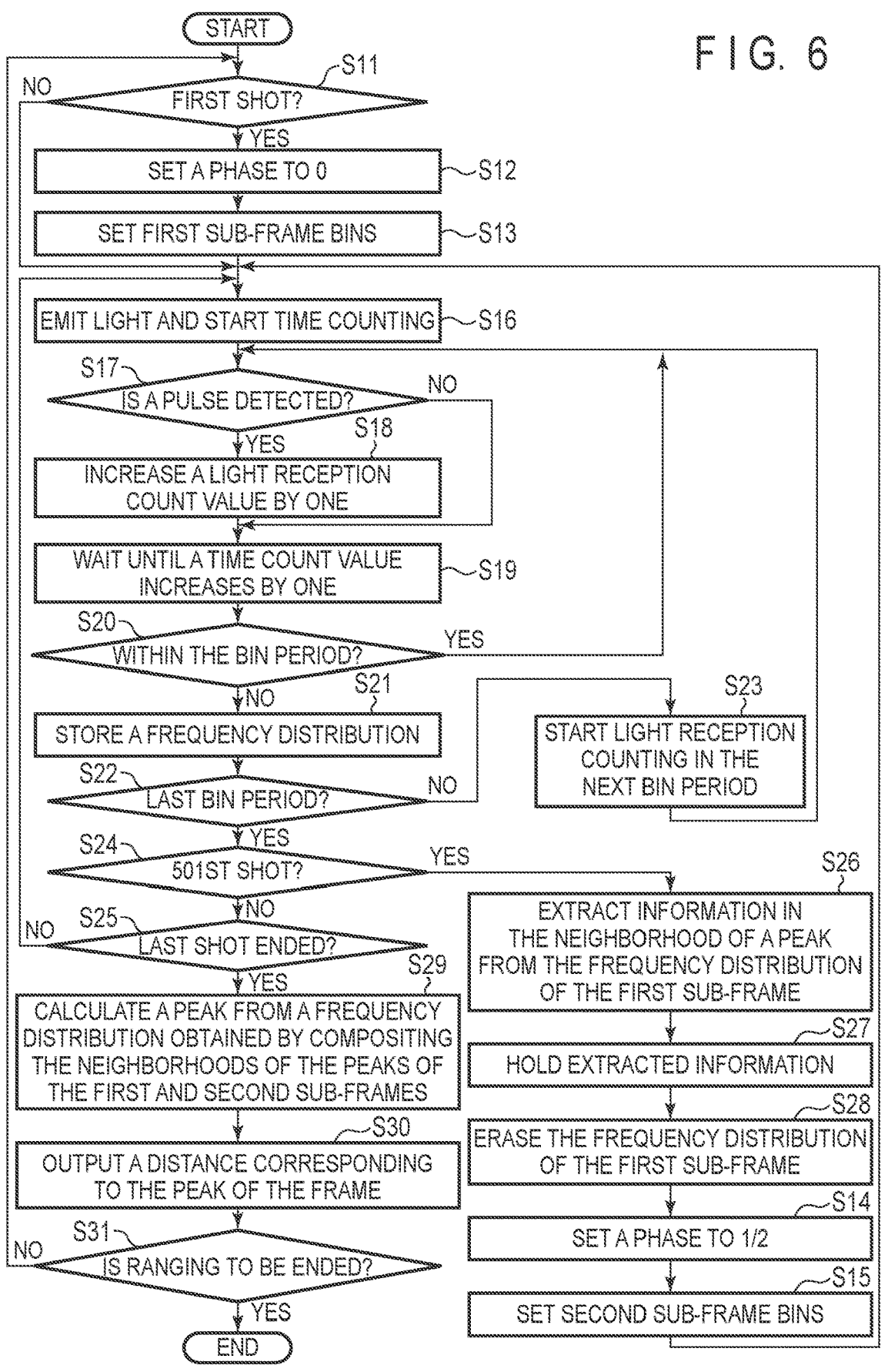
FIG. 6 is a flowchart illustrating an operation of the ranging device according to the first embodiment.

A more specific processing procedure of the present embodiment will be described with reference to FIG. 6. FIG. 6 is a flowchart illustrating the operation of the ranging device 30 according to the present embodiment, and illustrates an outline of the operation of the ranging device 30 from the start to the end of one ranging period. Also in the flowchart of FIG. 6, the number of shots in one frame period is 1000. Similarly to the above description, it is assumed that the number of shots in the first sub-frame period and the number of shots in the second sub-frame period are both 500, and the phases thereof are shifted by ½ of the bin width each other. However, the conditions such as the number of shots, the phases, and the like are merely examples, and are not limited to those described above.

In step S11, the control unit 331 determines whether or not the next shot is the first shot in the frame being processed. When the next shot is the first shot (YES in the step S11), the process proceeds to step S12. When the next shot is not the first shot (NO in the step S11), the process proceeds to step S16.

In the step S12, since the first shot belongs to the first sub-frame, the phase setting unit 334 sets the phase to "0" which is a value for the first sub-frame. In step S13, the bin number generation unit 336 generates bin numbers (0, 2, 4, . . . ) for the first sub-frame. Thus, bins for the first sub-frame are set.

In the step S16, the control unit 331 controls the light emitting unit 31 and the time counting unit 332 to start the operation of one shot. The light emitting unit 31 emits light to the outside of the ranging device 30. At the same time, the time counting unit 332 starts time counting. Synchronization control of these start timings is performed by the control unit 331.

The light receiving unit 32 receives light including reflected light from the object 40. The light receiving unit 32 converts the light into a pulse signal by photoelectric conversion. The pulse signal is input to the frequency distribution generation unit 338. The rising edge of this pulse indicates that a photon is incident on the photoelectric conversion element.

In step S17, when the light receiving unit 32 detects the rising edge of the pulse (YES in the step S17), the process proceeds to step S18. When the light receiving unit 32 does not detect the rising edge of the pulse (NO in the step S17), the process proceeds to step S19.

In the step S18, based on the detection of the rising edge of the pulse, the light reception count value output from the light receiving unit 32 to the frequency distribution generation unit 338 is increased by one. Then, the process proceeds to the step S19.

In the step S19, the light receiving unit 32 waits until the time count value in the time counting unit 332 increases by one. When the time count value increases by one with the passage of time, the process proceeds to step S20.

In the step S20, when the current time indicated by the current time count value is within the current bin period (YES in the step S20), the process proceeds to the step S17, and detection of a pulse in the current bin period continues. When the current time is not within the current bin period (NO in the step S20), the process proceeds to step S21, and detection of a pulse in one bin period ends. That is, the processing of a loop from the step S17 to the step S20 corresponds to the processing of one bin period in FIG. 2.

In the step S21, the frequency distribution generation unit 338 associates the information input from the time counting unit 332 and the light receiving unit 32 in the bin period being processed using the bin number that is set in the step S13 or step S15 described later. The frequency distribution generation unit 338 stores the information generated by this processing in the frequency distribution holding unit 339 as information constituting the frequency distribution.

In step S22, when the current time indicated by the current time count value is before the completion time of the last bin period (NO in the step S22), the process proceeds to step S23. In this case, in the step S23, the bin switching processing for starting the light reception count in the next bin period is performed, and the process proceeds to the step S17. When the current time is after the last bin period (YES in the step S22), the process proceeds to step S24, and the processing of one shot ends.

In the step S24, the control unit 331 determines whether or not the next shot is the 501st shot in the frame being processed. This determination corresponds to determining whether or not the current time point is the timing of switching between the first sub-frame period and the second sub-frame period. When the next shot is the 501st shot (YES in the step S24), the process proceeds to step S26. When the next shot is not the 501st shot (NO in the step S24), the process proceeds to step S25.

In the step S26, the peak neighborhood information calculation unit 341 extracts information of bins in the neighborhood of a peak from the frequency distribution of the first sub-frame held in the frequency distribution holding unit 339. In step S27, the extracted information is held in the peak neighborhood information holding unit 342. Since this processing is the same as that described with reference to FIGS. 4A, 4B, 5A, 5B, and 5C, description thereof will be omitted.

In step S28, the holding information control unit 337 erases information of the frequency distribution of the first sub-frame held in the frequency distribution holding unit 339. Thus, since the erased storage capacity can be used for holding the frequency distribution of the second sub-frame, it is not necessary to prepare a storage capacity for the second sub-frame separately from the storage capacity for the first sub-frame. Therefore, the storage capacity in the frequency distribution holding unit 339 can be reduced. Then, the process proceeds to step S14.

In the step S14, the phase setting unit 334 sets the phase to "½" which is a value for the second sub-frame. This phase is shifted by ½ (a half of the bin width) from the phase set in the step S12. In step S15, the bin number generation unit 336 generates bin numbers (1, 3, 5, . . . ) for the second sub-frame. Thus, bins for the second sub-frame is set. Thereafter, the process proceeds to the step S16, and the processing in the second sub-frame period is started.

In the step S25, the control unit 331 determines whether or not the processing of the last shot has ended, that is, whether or not the shot that has been processed immediately before is the 1000th shot in the frame being processed. When the processing of the last shot is ended (YES in the step S25), the process proceeds to step S29. When the processing of the last shot is not ended (NO in the step S25), the process proceeds to the step S16, and the operation of the next shot is started. That is, the processing of a loop from the step S16 to the step S25 corresponds to the processing of one shot period in FIG. 2.

In the step S29, the peak neighborhood information compositing unit 343 calculates a peak from a frequency distribution obtained by compositing the neighborhood of the peak of the first sub-frame and the neighborhood of the peak of the second sub-frame. In step S30, the peak neighborhood information compositing unit 343 calculates a distance corresponding to the peak of the composited frequency distribution, and outputs the calculated distance to the outside of the ranging device 30. Since these processes are the same as those described with reference to FIGS. 5A, 5B, and 5C, description thereof will be omitted.

In step S31, the control unit 331 determines whether or not to end the ranging in the ranging device 30. When it is determined that the ranging is to be ended (YES in the step S31), the process ends. When it is determined that the ranging is not to be ended (NO in the step S31), the process proceeds to the step S11, and the ranging in the next frame period is started. This determination may be based on, for example, a control signal or the like from a device on which the ranging device 30 is mounted.

As described above, by using the first frequency distribution of the first sub-frame and the second frequency distribution of the second sub-frame having different phases at the time of acquisition for ranging, a distance resolution higher than the distance resolution of each frequency distribution can be ensured. In addition, the holding information control unit 337 controls the frequency distribution holding unit 339 so that at least a part of the first frequency distribution can be erased before the holding of the second frequency distribution is completed. Thus, according to the present embodiment, it is possible to provide the ranging device 30 in which the storage capacity required for holding the frequency distribution is reduced while maintaining the ranging accuracy.

As described above, in the present embodiment, the number of divisions set by the phase setting unit 334 is two, but the number of divisions may be three or more. In the example in which the number of divisions is increased by more than 2, it is necessary to add the peak neighborhood information holding unit 342 so that the peak neighborhood information of each of the added sub-frames can be held. Since the peak neighborhood information holding unit 342 can hold information only in the neighborhood of the peak in the entire frequency distribution, the storage capacity is reduced in this modified example as well as in the case of storing information of all sub-frames.

In the present embodiment, one frame period is divided into two sub-frame periods, and different phases are set in each of the two sub-frame periods, but periods in which different phases are set are not limited to this example. For example, different phases may be set for each of the two frame periods, and the same operation as the first sub-frame and the second sub-frame of the present embodiment may be performed for each of the two frames.

Second Embodiment

In a ranging device for a vehicle, accuracy of ranging at a short distance is required in order to avoid collision or the like. As described above, depending on the application of the ranging device, the ranging accuracy required for the short distance and the long distance may be different. In the present embodiment, an example will be described in which the ranging accuracy is made different depending on the distance by narrowing the bin width of the short distance and widening the bin width of the long distance in order to meet such an application. In the present embodiment, description of elements common to those in the first embodiment may be omitted or simplified.

Figure 7:
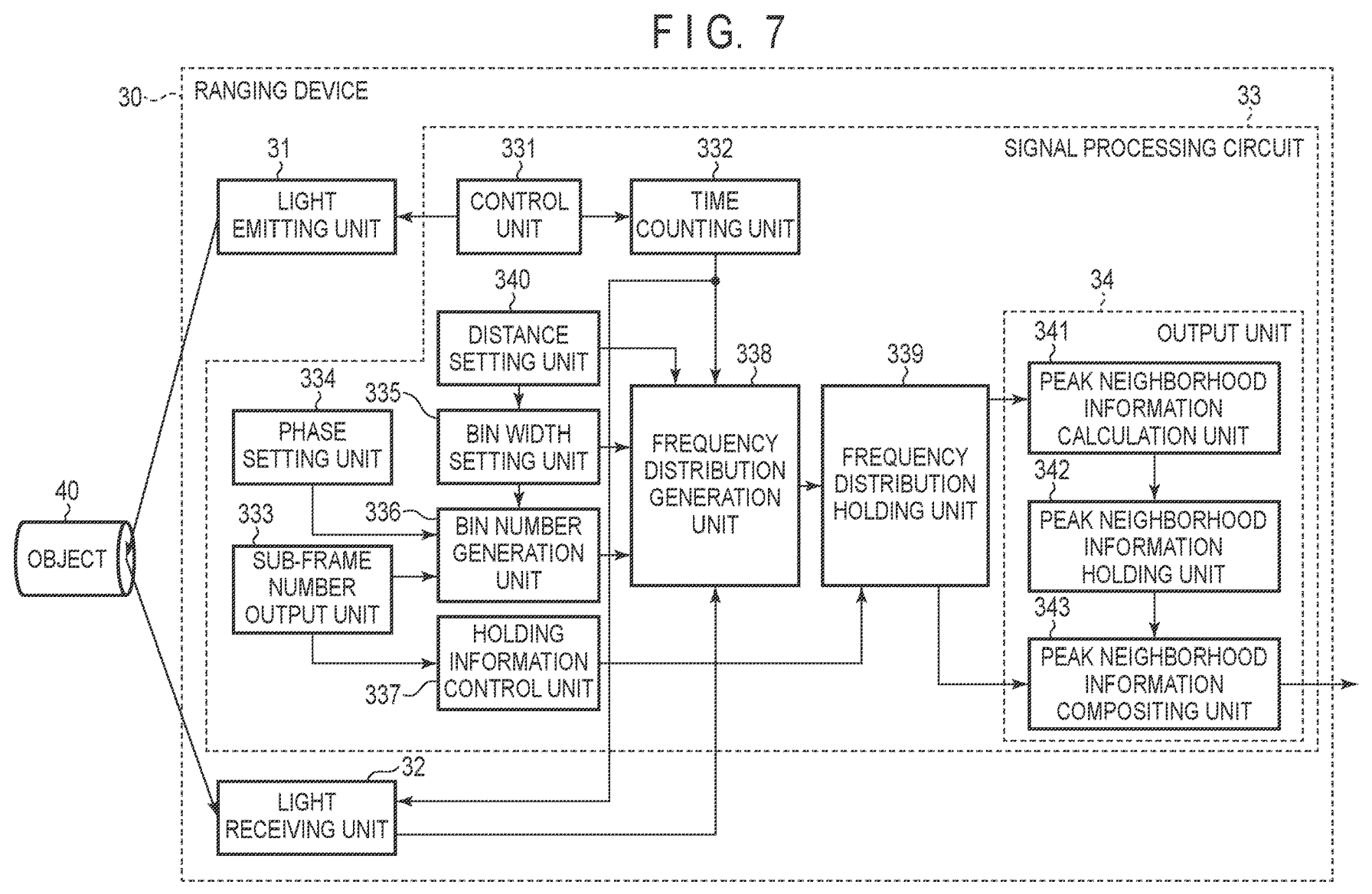

FIG. 7 is a block diagram illustrating a schematic configuration example of the ranging device 30 according to the present embodiment. The ranging device 30 further includes a distance setting unit 340 in addition to the elements illustrated in FIG. 1 of the first embodiment. The distance setting unit 340 sets a distance range between a short distance and a long distance. For example, in the present embodiment, it is assumed that the short distance is within 60 centimeters from the ranging device 30, and the long distance is more than 60 centimeters from the ranging device 30.

The bin width setting unit 335 sets two types of bin widths for short distance and long distance based on the setting information from the distance setting unit 340. Here, it is assumed that the distance setting unit 340 sets the bin width to a time interval corresponding to 10 centimeters for a bin in the short distance range, and sets the bin width to a time interval corresponding to 20 centimeters for a bin in the long distance range.

FIGS. 8A to 8E are histograms illustrating examples of frequency distributions acquired in the present embodiment. FIG. 8A is an example of a histogram illustrating a frequency distribution generated in the first sub-frame period. A period from time t0 to time t6 is a period corresponding to the short distance, and a bin width TB3 in FIG. 8A indicates a bin width of a bin period for the short distance (first bin period). A period from the time t6 to time t11 is a period corresponding to the long distance, and a bin width TB4 in FIG. 8A indicates a bin width of a bin period for the long distance (second bin period). Thus, the bin width TB4 corresponding to the long distance is wider than the bin width TB3 corresponding to the short distance, and more specifically, the bin width TB4 is twice the bin width TB3.

FIG. 8B is an example of a histogram illustrating a frequency distribution generated in the second sub-frame period. Also in the present embodiment, it is assumed that the phase in the second sub-frame is set to "½". That is, the phase setting unit 334 sets the time difference for the short distance from the time t0 to TB5, which is a half of the bin width TB3 for the short distance set by the bin width setting unit 335. Further, the phase setting unit 334 sets the time difference for the long distance from the time t6 to TB6 which is a half of the bin width TB4 for the long distance set by the bin width setting unit 335.

Also in the present embodiment, the peak neighborhood information calculation unit 341 and the peak neighborhood information holding unit 342 acquire information in the neighborhood of the peak of the frequency distribution of the first sub-frame. FIG. 8C is a histogram corresponding to information held in the peak neighborhood information holding unit 342 in the frequency distribution generated in the first sub-frame period. FIG. 8D is a histogram in which only information necessary for compositing processing in the peak neighborhood information compositing unit 343 is left from the frequency distribution generated in the second sub-frame period. FIG. 8C illustrates a histogram of bins from time t4 to time t8. FIG. 8D illustrates a histogram of bins from time t3 to time t9, including before and after bins of a range from the time t4 to the time t8 in FIG. 8C. FIG. 8E is a histogram after the compositing processing.

The compositing processing will be described. As in the first embodiment, the bins in the overlapping range between the first sub-frame and the second sub-frame are multiplied by ½ and added together. In addition, the light reception count values are used as it is for bins in a range in which the first sub-frame and the second sub-frame do not overlap each other. As illustrated in FIG. 8E, in periods TB8 and TB10, the compositing processing is performed by the above-described processing.

However, a period TB9 from time t6 to time t7 includes a period in which the bin width is switched. Accordingly, as illustrated in a period TB7 of FIG. 8D, a period in which the light reception count cannot be acquired is included in a part of the second sub-frame. Even in such a case, an average value of the light reception count value PN6 of the first sub-frame and the light reception count value PN7 of the second sub-frame (PN6/2+PN7/2) is used for the frequency distribution after the compositing of the period TB9 from the time t6 to the time t7. As illustrated in FIG. 8E, since the bin (bin number 6) from the time t6 to the time t7 is a peak, it is possible to detect that the object 40 exists at a distance corresponding to the bin number 6 in this frame.

Note that the method of compositing the frequency distributions illustrated in the present embodiment is an example. When the bin widths are different between the short distance and the long distance, another compositing method may be applied as long as a frequency distribution with high distance resolution can be generated from a plurality of frequency distributions with different phases to identify a peak.

As described above, also in the present embodiment, the accuracy of ranging can be improved by compositing a plurality of frequency distributions having different phases as in the first embodiment. The holding information control unit 337 controls the frequency distribution holding unit 339 so that at least a part of the first frequency distribution can be erased before the holding of the second frequency distribution is completed. Thus, similarly to the first embodiment, it is possible to provide the ranging device 30 in which the storage capacity required for holding the frequency distribution is reduced while maintaining the ranging accuracy. Further, in the present embodiment, by making the bin widths different between the short distance and the long distance, the ranging accuracy of the short distance and the ranging accuracy of the long distance can be made different.

Third Embodiment

In the present embodiment, a specific configuration example of a photoelectric conversion device including an avalanche photodiode which can be applied to the ranging device 30 according to the first or second embodiment will be described. The configuration example of the present embodiment is an example, and the photoelectric conversion device applicable to the ranging device 30 is not limited thereto.

FIG. 9 is a schematic diagram illustrating an overall configuration of the photoelectric conversion device 100 according to the present embodiment. The photoelectric conversion device 100 includes a sensor substrate 11 (first substrate) and a circuit substrate 21 (second substrate) stacked on each other. The sensor substrate 11 and the circuit substrate 21 are electrically connected to each other. The sensor substrate 11 has a pixel region 12 in which a plurality of pixels 101 are arranged to form a plurality of rows and a plurality of columns. The circuit substrate 21 includes a first circuit region 22 in which a plurality of pixel signal processing units 103 are arranged to form a plurality of rows and a plurality of columns, and a second circuit region 23 arranged outside the first circuit region 22. The second circuit region 23 may include a circuit for controlling the plurality of pixel signal processing units 103. The sensor substrate 11 has a light incident surface for receiving incident light and a connection surface opposed to the light incident surface. The sensor substrate 11 is connected to the circuit substrate 21 on the connection surface side. That is, the photoelectric conversion device 100 is a so-called backside illumination type.

In this specification, the term "plan view" refers to a view from a direction perpendicular to a surface opposite to the light incident surface. The cross section indicates a surface in a direction perpendicular to a surface opposite to the light incident surface of the sensor substrate 11. Although the light incident surface may be a rough surface when viewed microscopically, in this case, a plan view is defined with reference to the light incident surface when viewed macroscopically.

In the following description, the sensor substrate 11 and the circuit substrate 21 are diced chips, but the sensor substrate 11 and the circuit substrate 21 are not limited to chips. For example, the sensor substrate 11 and the circuit substrate 21 may be wafers. When the sensor substrate 11 and the circuit substrate 21 are diced chips, the photoelectric conversion device 100 may be manufactured by being diced after being stacked in a wafer state, or may be manufactured by being stacked after being diced.

FIG. 10 is a schematic block diagram illustrating an arrangement example of the sensor substrate 11. In the pixel region 12, a plurality of pixels 101 are arranged to form a plurality of rows and a plurality of columns. Each of the plurality of pixels 101 includes a photoelectric conversion unit 102 including an avalanche photodiode (hereinafter referred to as APD) as a photoelectric conversion element in the substrate.

Of the charge pairs generated in the APD, the conductivity type of the charge used as the signal charge is referred to as a first conductivity type. The first conductivity type refers to a conductivity type in which a charge having the same polarity as the signal charge is a majority carrier. Further, a conductivity type opposite to the first conductivity type, that is, a conductivity type in which a majority carrier is a charge having a polarity different from that of a signal charge is referred to as a second conductivity type. In the APD described below, the anode of the APD is set to a fixed potential, and a signal is extracted from the cathode of the APD. Accordingly, the semiconductor region of the first conductivity type is an N-type semiconductor region, and the semiconductor region of the second conductivity type is a P-type semiconductor region. Note that the cathode of the APD may have a fixed potential and a signal may be extracted from the anode of the APD. In this case, the semiconductor region of the first conductivity type is the P-type semiconductor region, and the semiconductor region of the second conductivity type is then N-type semiconductor region. Although the case where one node of the APD is set to a fixed potential is described below, potentials of both nodes may be varied.

FIG. 11 is a schematic block diagram illustrating a configuration example of the circuit substrate 21. The circuit substrate 21 has the first circuit region 22 in which a plurality of pixel signal processing units 103 are arranged to form a plurality of rows and a plurality of columns.

The circuit substrate 21 includes a vertical scanning circuit 110, a horizontal scanning circuit 111, a reading circuit 112, a pixel output signal line 113, an output circuit 114, and a control signal generation unit 115. The plurality of photoelectric conversion units 102 illustrated in FIG. 10 and the plurality of pixel signal processing units 103 illustrated in FIG. 11 are electrically connected to each other via connection wirings provided for each pixels 101.

The control signal generation unit 115 is a control circuit that generates control signals for driving the vertical scanning circuit 110, the horizontal scanning circuit 111, and the reading circuit 112, and supplies the control signals to these units. As a result, the control signal generation unit 115 controls the driving timings and the like of each unit.

The vertical scanning circuit 110 supplies control signals to each of the plurality of pixel signal processing units 103 based on the control signal supplied from the control signal generation unit 115. The vertical scanning circuit 110 supplies control signals for each row to the pixel signal processing unit 103 via a driving line provided for each row of the first circuit region 22. As will be described later, a plurality of driving lines may be provided for each row. A logic circuit such as a shift register or an address decoder can be used for the vertical scanning circuit 110. Thus, the vertical scanning circuit 110 selects a row to be output a signal from the pixel signal processing unit 103.

The signal output from the photoelectric conversion unit 102 of the pixels 101 is processed by the pixel signal processing unit 103. The pixel signal processing unit 103 acquires and holds a digital signal having a plurality of bits by counting the number of pulses output from the APD included in the photoelectric conversion unit 102.

It is not always necessary to provide one pixel signal processing unit 103 for each of the pixels 101. For example, one pixel signal processing unit 103 may be shared by a plurality of pixels 101. In this case, the pixel signal processing unit 103 sequentially processes the signals output from the photoelectric conversion units 102, thereby providing the function of signal processing to each pixel 101.

The horizontal scanning circuit 111 supplies control signals to the reading circuit 112 based on a control signal supplied from the control signal generation unit 115. The pixel signal processing unit 103 is connected to the reading circuit 112 via a pixel output signal line 113 provided for each column of the first circuit region 22. The pixel output signal line 113 in one column is shared by a plurality of pixel signal processing units 103 in the corresponding column. The pixel output signal line 113 includes a plurality of wirings, and has at least a function of outputting a digital signal from the pixel signal processing unit 103 to the reading circuit 112, and a function of supplying a control signal for selecting a column for outputting a signal to the pixel signal processing unit 103. The reading circuit 112 outputs a signal to an external storage unit or signal processing unit of the photoelectric conversion device 100 via the output circuit 114 based on the control signal supplied from the control signal generation unit 115.

The arrangement of the photoelectric conversion units 102 in the pixel region 12 may be one-dimensional. Further, the function of the pixel signal processing unit 103 does not necessarily have to be provided one by one in all the pixels 101. For example, one pixel signal processing unit 103 may be shared by a plurality of pixels 101. In this case, the pixel signal processing unit 103 sequentially processes the signals output from the photoelectric conversion units 102, thereby providing the function of signal processing to each pixel 101.

As illustrated in FIGS. 10 and 11, the first circuit region 22 having a plurality of pixel signal processing units 103 is arranged in a region overlapping the pixel region 12 in the plan view. In the plan view, the vertical scanning circuit 110, the horizontal scanning circuit 111, the reading circuit 112, the output circuit 114, and the control signal generation unit 115 are arranged so as to overlap a region between an edge of the sensor substrate 11 and an edge of the pixel region 12. In other words, the sensor substrate 11 includes the pixel region 12 and a non-pixel region arranged around the pixel region 12. In the circuit substrate 21, the second circuit region 23 (illustrated in FIG. 9) having the vertical scanning circuit 110, the horizontal scanning circuit 111, the reading circuit 112, the output circuit 114, and the control signal generation unit 115 is arranged in a region overlapping with the non-pixel region in the plan view.

Note that the arrangement of the pixel output signal line 113, the arrangement of the reading circuit 112, and the arrangement of the output circuit 114 are not limited to those illustrated in FIG. 11. For example, the pixel output signal lines 113 may extend in the row direction, and may be shared by a plurality of pixel signal processing units 103 in corresponding rows. The reading circuit 112 may be provided so as to be connected to the pixel output signal line 113 of each row.

FIG. 12 is a schematic block diagram illustrating a configuration example of one pixel of the photoelectric conversion unit 102 and the pixel signal processing unit 103 according to the present embodiment. FIG. 12 schematically illustrates a more specific configuration example including a connection relationship between the photoelectric conversion unit 102 arranged in the sensor substrate 11 and the pixel signal processing unit 103 arranged in the circuit substrate 21. In FIG. 12, driving lines between the vertical scanning circuit 110 and the pixel signal processing unit 103 in FIG. 11 are illustrated as driving lines 213 and 214.

The photoelectric conversion unit 102 includes an APD 201. The pixel signal processing unit 103 includes a quenching element 202, a waveform shaping unit 210, a counter circuit 211, and a selection circuit 212. The pixel signal processing unit 103 may include at least one of the waveform shaping unit 210, the counter circuit 211, and the selection circuit 212.

The APD 201 generates charge pairs corresponding to incident light by photoelectric conversion. A voltage VL (first voltage) is supplied to the anode of the APD 201. The cathode of the APD 201 is connected to a first terminal of the quenching element 202 and an input terminal of the waveform shaping unit 210. A voltage VH (second voltage) higher than the voltage VL supplied to the anode is supplied to the cathode of the APD 201. As a result, a reverse bias voltage that causes the APD 201 to perform the avalanche multiplication operation is supplied to the anode and the cathode of the APD 201. In the APD 201 to which the reverse bias voltage is supplied, when a charge is generated by the incident light, this charge causes avalanche multiplication, and an avalanche current is generated.

The operation modes in the case where a reverse bias voltage is supplied to the APD 201 include a Geiger mode and a linear mode. The Geiger mode is a mode in which a potential difference between the anode and the cathode is higher than a breakdown voltage, and the linear mode is a mode in which a potential difference between the anode and the cathode is near or lower than the breakdown voltage.

The APD operated in the Geiger mode is referred to as a single photon avalanche diode (SPAD). In this case, for example, the voltage VL (first voltage) is −30 V, and the voltage VH (second voltage) is 1 V. The APD 201 may operate in the linear mode or the Geiger mode. In the case of the SPAD, a potential difference becomes greater than that of the APD of the linear mode, and the effect of avalanche multiplication becomes significant, so that the SPAD is preferable.

The quenching element 202 functions as a load circuit (quenching circuit) when a signal is multiplied by avalanche multiplication. The quenching element 202 suppresses the voltage supplied to the APD 201 and suppresses the avalanche multiplication (quenching operation). Further, the quenching element 202 returns the voltage supplied to the APD 201 to the voltage VH by passing a current corresponding to the voltage drop due to the quenching operation (recharge operation). The quenching element 202 may be, for example, a resistive element.

The waveform shaping unit 210 shapes the potential change of the cathode of the APD 201 obtained at the time of photon detection, and outputs a pulse signal. For example, an inverter circuit is used as the waveform shaping unit 210. Although FIG. 12 illustrates an example in which one inverter is used as the waveform shaping unit 210, the waveform shaping unit 210 may be a circuit in which a plurality of inverters are connected in series, or may be another circuit having a waveform shaping effect.

The counter circuit 211 counts the pulse signals output from the waveform shaping unit 210, and holds a digital signal indicating the count value. When a control signal is supplied from the vertical scanning circuit 110 through the driving line 213, the counter circuit 211 resets the held signal.

The selection circuit 212 is supplied with a control signal from the vertical scanning circuit 110 illustrated in FIG. 11 through the driving line 214 illustrated in FIG. 12. In response to this control signal, the selection circuit 212 switches between the electrical connection and the non-connection of the counter circuit 211 and the pixel output signal line 113. The selection circuit 212 includes, for example, a buffer circuit or the like for outputting a signal corresponding to a value held in the counter circuit 211.

In the example of FIG. 12, the selection circuit 212 switches between the electrical connection and the non-connection of the counter circuit 211 and the pixel output signal line 113; however, the method of controlling the signal output to the pixel output signal line 113 is not limited thereto. For example, a switch such as a transistor may be arranged at a node such as between the quenching element 202 and the APD 201 or between the photoelectric conversion unit 102 and the pixel signal processing unit 103, and the signal output to the pixel output signal line 113 may be controlled by switching the electrical connection and the non-connection. Alternatively, the signal output to the pixel output signal line 113 may be controlled by changing the value of the voltage VH or the voltage VL supplied to the photoelectric conversion unit 102 using a switch such as a transistor.

FIG. 12 illustrates a configuration example using the counter circuit 211. However, instead of the counter circuit 211, a time-to-digital converter (TDC) and a memory may be used to acquire a timing at which a pulse is detected. In this case, the generation timing of the pulsed signal output from the waveform shaping unit 210 is converted into a digital signal by the TDC. In this case, a control signal (reference signal) can be supplied from the vertical scanning circuit 110 illustrated in FIG. 11 to the TDC via the driving line. The TDC acquires, as a digital signal, a signal indicating a relative time of input timing of a pulse with respect to the control signal.

FIGS. 13A, 13B, and 13C are diagrams illustrating an operation of the APD 201 according to the present embodiment. FIG. 13A is a diagram illustrating the APD 201, the quenching element 202, and the waveform shaping unit 210 in FIG. 12. As illustrated in FIG. 13A, the connection node of the APD 201, the quenching element 202, and the input terminal of the waveform shaping unit 210 is referred to as node A. Further, as illustrated in FIG. 13A, an output side of the waveform shaping unit 210 is referred to as node B.

FIG. 13B is a graph illustrating a temporal change in the potential of node A in FIG. 13A. FIG. 13C is a graph illustrating a temporal change in the potential of node B in FIG. 13A. During a period from time t20 to time t21, the voltage VH-VL is applied to the APD 201 in FIG. 13A. When a photon enters the APD 201 at the time t21, avalanche multiplication occurs in the APD 201. As a result, an avalanche current flows through the quenching element 202, and the potential of the node A drops. Thereafter, the amount of potential drop further increases, and the voltage applied to the APD 201 gradually decreases. Then, at time t22, the avalanche multiplication in the APD 201 stops. Thereby, the voltage level of node A does not drop below a certain constant value. Then, during a period from the time t22 to time t23, a current that compensates for the voltage drop flows from the node of the voltage VH to the node A, and the node A is settled to the original potential at the time t23.

In the above-described process, the potential of node B becomes the high level in a period in which the potential of node A is lower than a certain threshold value. In this way, the waveform of the drop of the potential of the node A caused by the incidence of the photon is shaped by the waveform shaping unit 210 and output as a pulse to the node B.

The light receiving unit 32 in the first or second embodiment corresponds to, for example, the photoelectric conversion device 100 of the present embodiment. According to the present embodiment, a photoelectric conversion device using an avalanche photodiode which can be applied to the ranging device 30 of the first or second embodiment is provided.

Fourth Embodiment

FIG. 14 is a block diagram of a photodetection system according to the present embodiment. More specifically, FIG. 14 is a block diagram of a distance image sensor and a light source device as an example of the ranging device 30 described in the above embodiments.

As illustrated in FIG. 14, the distance image sensor 401 includes an optical system 402, a photoelectric conversion device 403, an image processing circuit 404, a monitor 405, and a memory 406. The distance image sensor 401 receives light (modulated light or pulsed light) emitted from a light source device 411 toward an object and reflected by the surface of the object. The distance image sensor 401 can acquire a distance image corresponding to a distance to the object based on a time period from light emission to light reception. The light source device 411 corresponds to the light emitting unit 31 of the above embodiments, the photoelectric conversion device 403 corresponds to the light receiving unit 32 of the above embodiments, and the image processing circuit 404 corresponds to the signal processing circuit 33 of the above embodiments.

The optical system 402 includes one or a plurality of lenses, and guides image light (incident light) from the object to the photoelectric conversion device 403 to form an image on a light receiving surface (sensor portion) of the photoelectric conversion device 403.

The photoelectric conversion device 403 supplies a distance signal indicating a distance obtained from the received light signal to the image processing circuit 404. The image processing circuit 404 performs image processing for forming a distance image based on the distance signal supplied from the photoelectric conversion device 403. The distance image (image data) obtained by the image processing can be displayed on the monitor 405 and stored (recorded) in the memory 406.

The distance image sensor 401 configured in this manner can acquire an accurate distance image by applying the configuration of the above-described embodiment.

Fifth Embodiment

FIGS. 15A and 15B are block diagrams of equipment relating to an in-vehicle ranging device according to the present embodiment. Equipment 80 includes a distance measurement unit 803, which is an example of the ranging device of the above-described embodiments, and a signal processing device (processing device) that processes a signal from the distance measurement unit 803. The equipment 80 includes the distance measurement unit 803 that measures a distance to an object, and a collision determination unit 804 that determines whether or not there is a possibility of collision based on the measured distance. The distance measurement unit 803 is an example of a distance information acquisition unit that obtains distance information to the object. That is, the distance information is information on a distance to the object or the like. The collision determination unit 804 may determine the collision possibility using the distance information.

The equipment 80 is connected to a vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm, displaying alert information on a screen of a car navigation system or the like, or giving vibration to a seat belt or a steering wheel. These devices of the equipment 80 function as a movable body control unit that controls the operation of controlling the vehicle as described above.

In the present embodiment, ranging is performed in an area around the vehicle, for example, a front area or a rear area, by the equipment 80. FIG. 15B illustrates equipment when ranging is performed in the front area of the vehicle (ranging area 850). The vehicle information acquisition device 810 as a ranging control unit sends an instruction to the equipment 80 or the distance measurement unit 803 to perform the ranging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above embodiment, and various modifications are possible. For example, an example in which some of the configurations of any one of the embodiments are added to other embodiments and an example in which some of the configurations of any one of the embodiments are replaced with some of the configurations of other embodiments are also embodiments of the present invention.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-117785, filed Jul. 25, 2022, which is hereby incorporated by reference herein in its entirety.

What is claimed is:

1. A ranging device comprising:
a time counting unit configured to perform time counting;
a light receiving unit configured to generate a pulse based on light including reflected light from an object and counts the pulse to acquire a light reception count value;
a frequency distribution generation unit configured to generate a frequency distribution of the light reception count value counted in each of a plurality of bin periods in the time counting;
a frequency distribution holding unit configured to hold the frequency distribution generated by the frequency distribution generation unit;
a phase setting unit configured to set a phase of start timings of the plurality of bin periods with respect to periodic light emission timings to the object;
a holding information control unit configured to control holding of information in the frequency distribution holding unit; and
an output unit configured to output distance information, wherein in a case where a first frequency distribution acquired by a first phase in a first period is held in the frequency distribution holding unit, and then a second frequency distribution acquired by a second phase different from the first phase in a second period next to the first period is held in the frequency distribution holding unit, the holding information control unit controls the frequency distribution holding unit so that at least a part of the first frequency distribution is erased from the frequency distribution holding unit before the holding of the second frequency distribution is completed, and
wherein the output unit holds a part of the first frequency distribution before the first frequency distribution is erased.

2. The ranging device according to claim 1, wherein the holding information control unit erases all of the first frequency distribution from the frequency distribution holding unit after the first frequency distribution is held and before the holding of the second frequency distribution is completed.

3. The ranging device according to claim 1, wherein the first frequency distribution and the second frequency distribution are held in the same storage area in the frequency distribution holding unit.

4. The ranging device according to claim 1 further comprising:
a light emitting unit configured to emit light to the object; and
a control unit configured to synchronously control a light emission timing of the light emitting unit and a timing at which the time counting unit starts counting.

5. The ranging device according to claim 1, wherein the output unit outputs the distance information based on a third frequency distribution obtained by compositing the part of the first frequency distribution held in the output unit and a part of the second frequency distribution.

6. The ranging device according to claim 5, wherein the part of the first frequency distribution includes a bin period in which the light reception count value is largest in the first frequency distribution.

7. The ranging device according to claim 6, wherein the part of the second frequency distribution includes a plurality of bin periods corresponding to a bin period in which the light reception count value is largest in the first frequency distribution.

8. The ranging device according to claim 5, wherein the output unit generates the third frequency distribution by compositing a frequency distribution of a predetermined number of bin periods selected from the first frequency distribution in descending order of the number of light reception count values and a frequency distribution of a predetermined number of bin periods selected from the second frequency distribution in descending order of the number of light reception count values.

9. The ranging device according to claim 5, wherein the output unit extracts and outputs the distance information from a bin period in which the light reception count value is largest in the third frequency distribution.

10. The ranging device according to claim 1, wherein each of the first frequency distribution and the second frequency distribution includes a light reception count value counted in a first bin period and a light reception count value counted in a second bin period having a longer time interval than the first bin period.

11. The ranging device according to claim 10, wherein a distance corresponding to the second bin period is greater than a distance corresponding to the first bin period.

12. A photodetection system comprising:
the ranging device according to claim 1; and
a signal processing unit configured to process a signal output from the ranging device.

13. A movable body comprising:

the ranging device according to claim 1; and a movable body control unit configured to control the movable body based on distance information acquired by the ranging device.

\* \* \* \* \*